United States Patent [19]

Breitenstein et al.

[11] Patent Number: 4,680,896
[45] Date of Patent: Jul. 21, 1987

[54] TOOL UNLOADING MECHANISM FOR AUTOMATIC TOOL GRINDING MACHINE

[75] Inventors: Charles T. Breitenstein, Elk Grove Village; Allen R. Holecek, Rockton, both of Ill.

[73] Assignee: Carbide International Inc., Elk Grove Village, Ill.

[21] Appl. No.: 784,359

[22] Filed: Oct. 3, 1985

Related U.S. Application Data

[62] Division of Ser. No. 524,443, Aug. 18, 1983, Pat. No. 4,608,643.

[51] Int. Cl.$^4$ ............................................. B24B 47/02
[52] U.S. Cl. ............................. 51/215 UE; 51/215 H; 51/216 ND; 51/165.82; 29/568
[58] Field of Search ... 51/215 UE, 215 AR, 215 HM, 51/215 CP, 215 H, 53, 108 R, 216 ND, 237 T, 165.82; 414/223, 750, 744 R; 29/26 A, 568

[56] References Cited

U.S. PATENT DOCUMENTS

| | | | |
|---|---|---|---|
| 1,819,308 | 8/1931 | Walker | 51/108 R |
| 2,398,466 | 4/1946 | Scherb | 51/237 T |
| 4,041,601 | 8/1977 | Schimanski | 29/568 |
| 4,087,901 | 5/1978 | Lohneis | 29/568 |
| 4,122,598 | 10/1978 | Pegler | 29/568 |
| 4,358,888 | 11/1982 | Zankl | 414/223 |
| 4,581,810 | 4/1986 | Kawakami | 29/26 A |

Primary Examiner—Frederick R. Schmidt
Assistant Examiner—Bradley I. Vaught
Attorney, Agent, or Firm—Burmeister, York, Palmatier, Hamby & Jones

[57] ABSTRACT

Successively finished drills or other tools are ejected from a chuck into successive angularly spaced openings in a rotary turret, mounted on a carriage with a power device for reciprocating the turret into and out of an unloading position. A ratchet wheel on the turret is indexed through successive detented positions by engagement of the ratchet wheel with a pawl, as an incident to the reciprocating movement. The pawl is mounted on a stationary pivot and is biased into the path of the reciprocating ratchet wheel.

2 Claims, 37 Drawing Figures

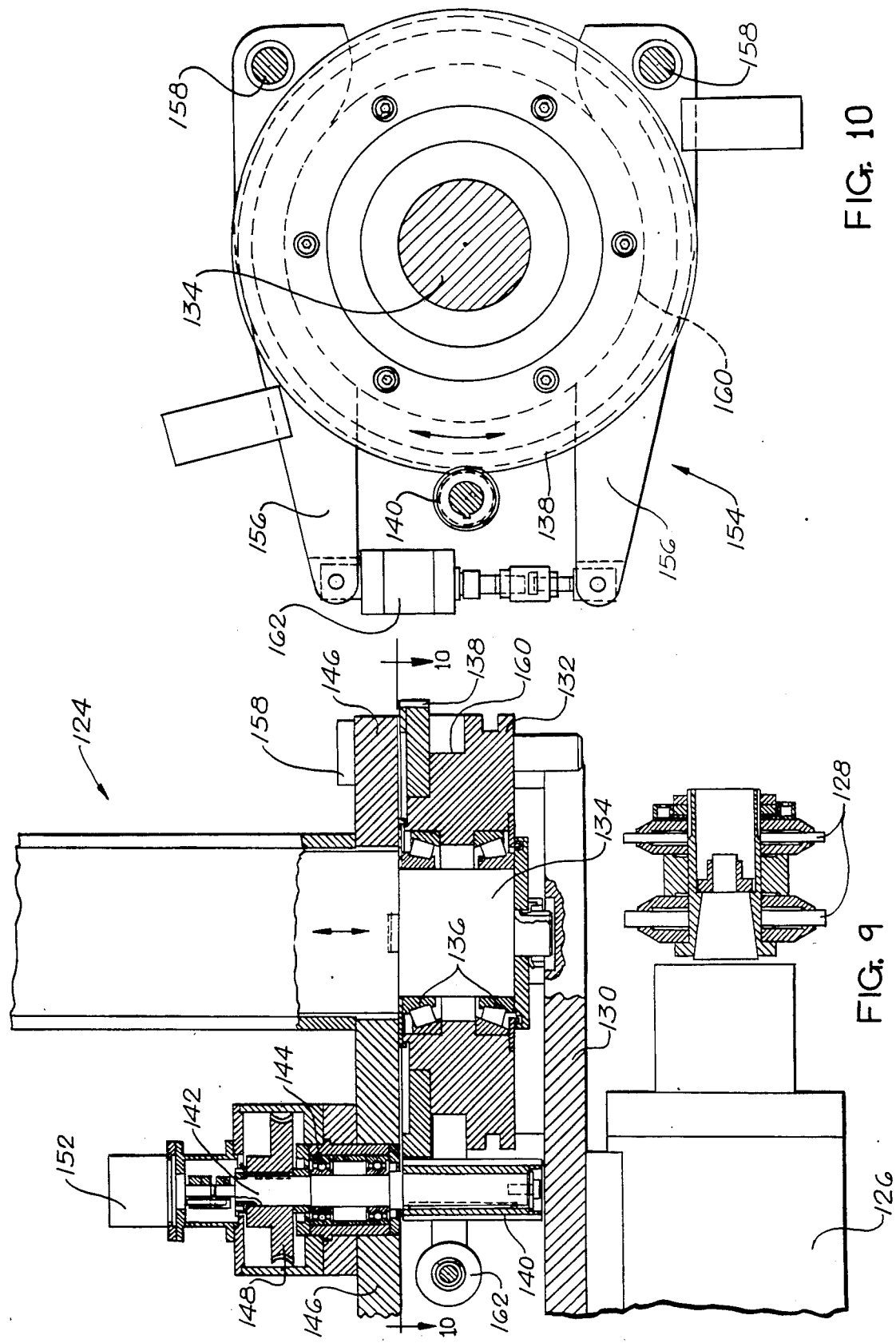

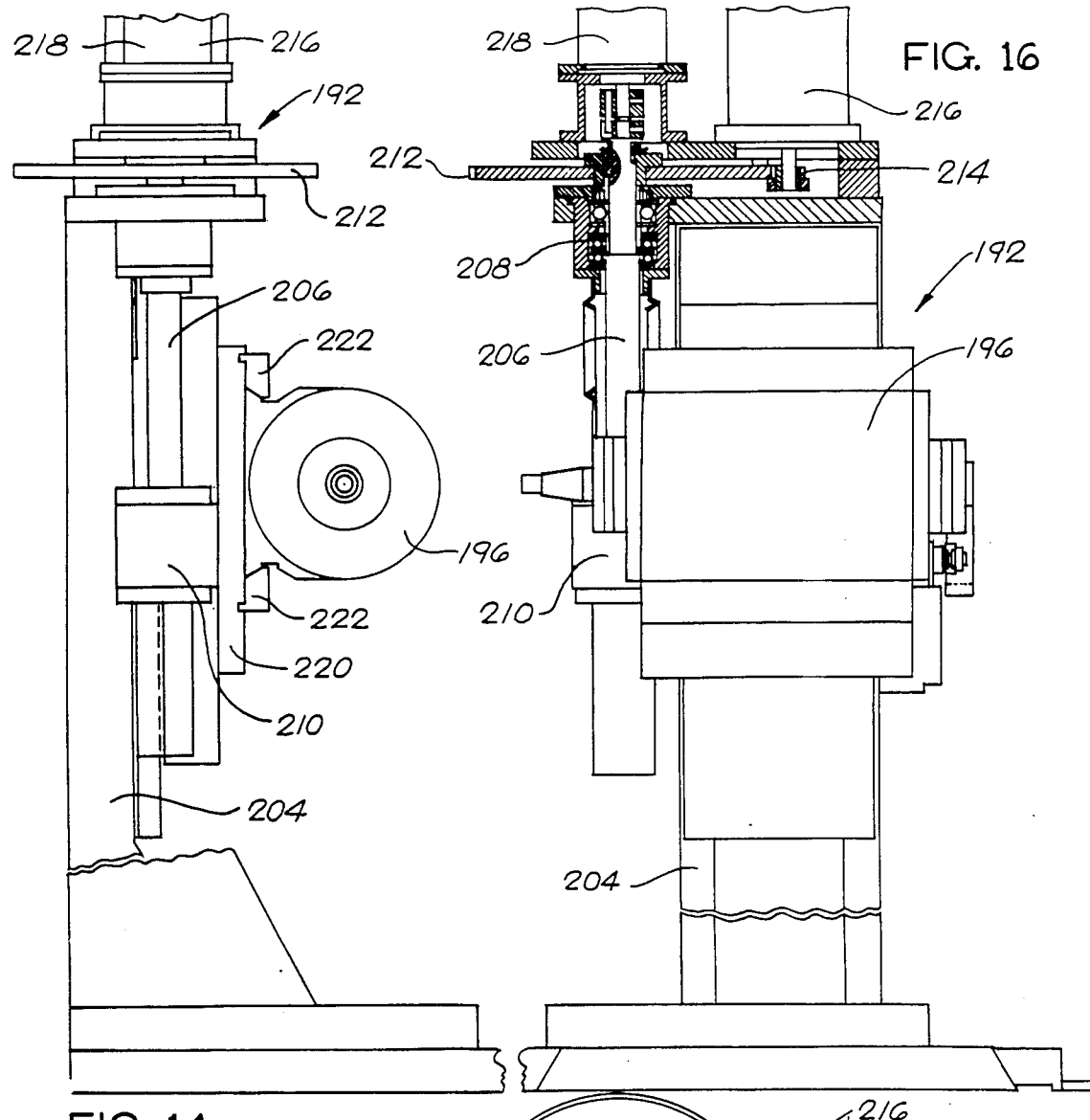
FIG. 16
FIG. 14
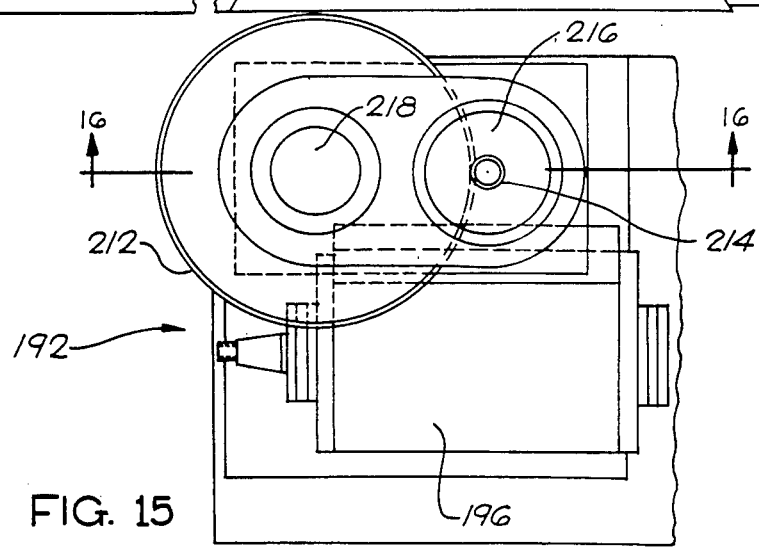
FIG. 15

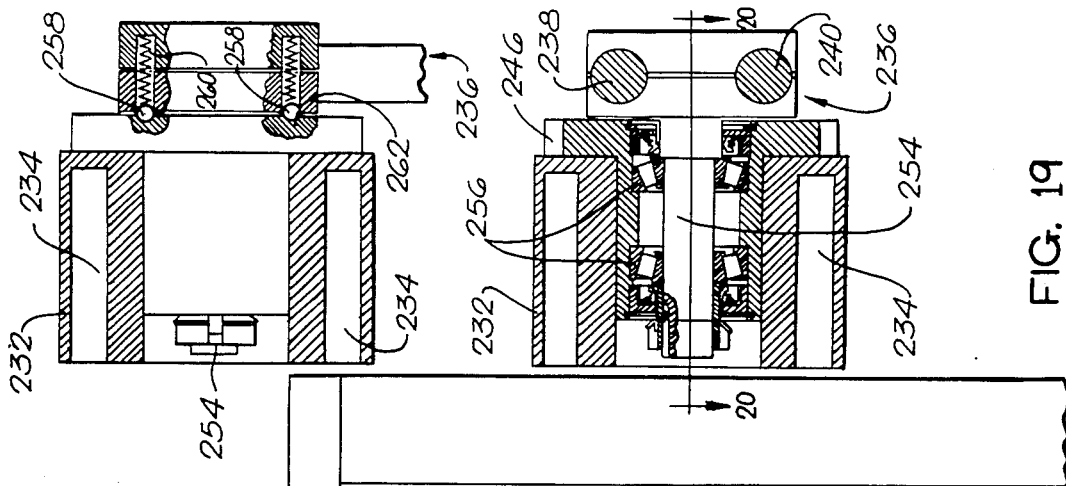
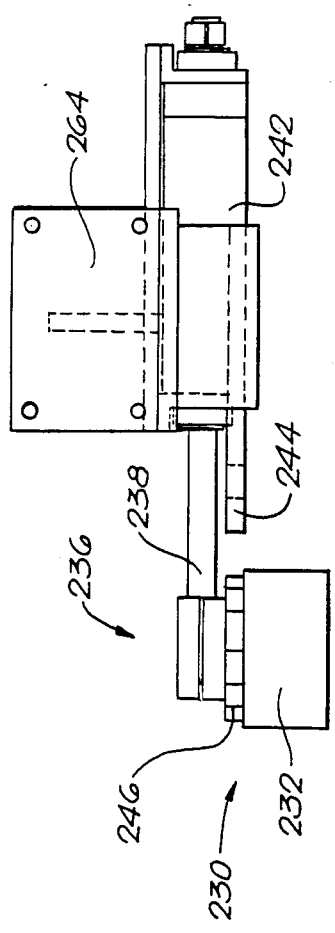
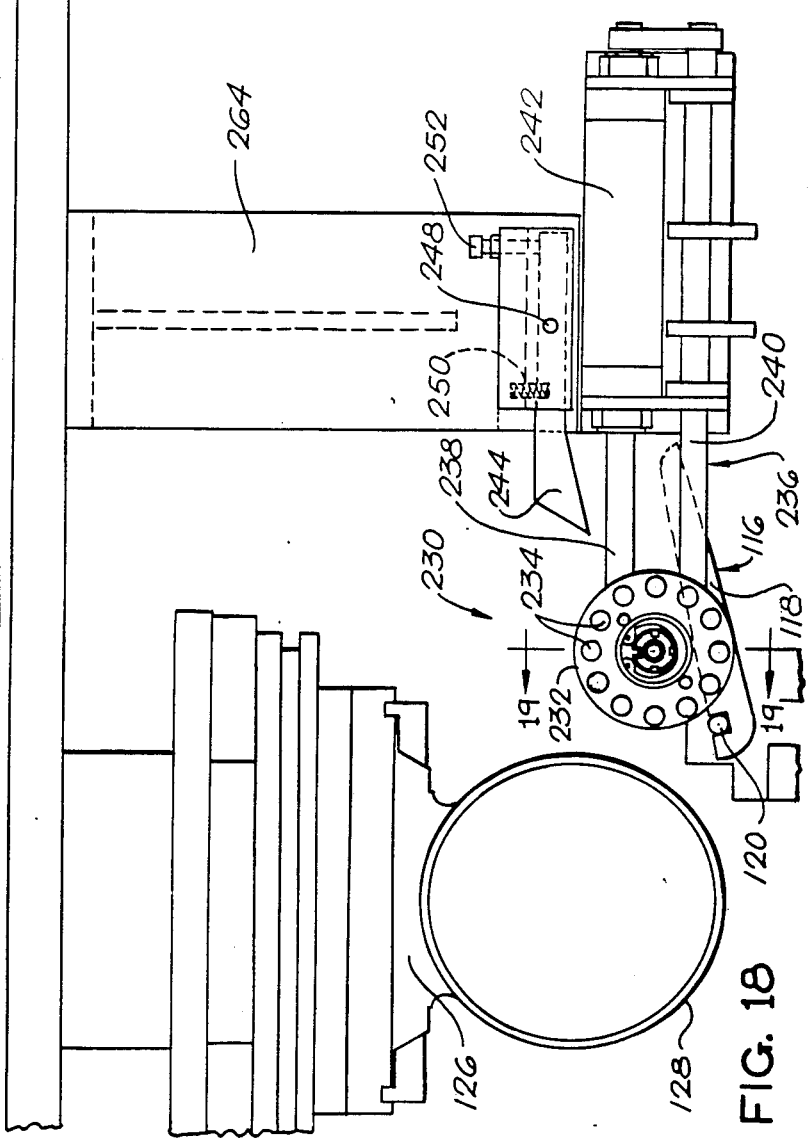

SET-UP PAGE

QUESTIONS            340
                                          ANSWERS

342 —— * NO. OF STEPS

TOOL TIP DIA.

TOOL LENGTH

CYCLE TIME

AUTO-LOAD ON (0)   OFF (1)

X-LOAD POS.

X-UNLOAD POS.

Y-LOAD POS.

Y-UNLOAD POS.

LOAD FEED-RATE

WHEEL CENTER TO CHUCK TIP

OPR 1    CON HLX   OFF - 0   /   ON - 1

Z-RET. POS. (3" = NORM.)

FIG. 24

STEP     STA 1
FLT - RLV

340

QUESTIONS                      ANSWERS

342 —— * Z-DEPTH (- DEEP)

R-OFFSET

X-FEED RATE

X-RETURN POINT

X-FORWARD POINT

Y-CROSS SLIDE POS.

HELIX ANGLE

NO. OF FLUTES

SMALL DIA.

TAPER LENGTH

A-WHEEL ANGLE

SCW-0 / FCW-1 / SCCW-2     FCCW-3

R.H. (0) / L.H. (1) / ST.RT (2)

R - RETURN OFFSET

X - RETURN FEED RATE

FIG. 25

STEP    STA 2
RLV   P/S

|  | 340 |
|---|---|
| QUESTIONS | ANSWERS |

342——* X-DEPTH (- DEEP) - SEC.

R-OFFSET - SEC.

Y-FEED RATE - SEC.

X-DEPTH (-DEEP) - PRIM.

R-OFFSET - PRIM.

Y-FEED RATE - PRIM.

Y-FORWARD POINT

Y-RETURN POINT

HELIX ANGLE

NO. OF FLUTES

SMALL DIA.

LARGE DIA.

TAPER LENGTH

R.H. (0)  /  L.H. (1)  /  STRT (2)

FIG. 26

STEP     STA 3
GASH

QUESTIONS                                340
                                          |
                                       ANSWERS

342 —— * V-DEPTH (- DEEP) # 1

X-TABLE POS. # 1

Y-CROSS SLIDE POS. (+ DEEP) # 1

V-DEPTH (- DEEP) # 2

X-TABLE POS. # 2

Y-CROSS SLIDE (+ DEEP) # 2

R-OFFSET

V FEED RATE

V-START POS.

NO. OF FLUTES

FIG. 27

STEP   STA 4
FACE
                                          340
                                           |
QUESTIONS                               ANSWERS

342——* Y-START POS. (+ DEEP)

X-START POS.

X-FEED STROKE (+ OR -)

X-FEED RATE

X-V FEED ANGLE

V-START POS.

V-DEPTH (- DEEP)

V-FEED RATE

R-OFFSET

NO. OF FLUTES

FIG. 28

STEP     STA 5
POINT
                                    340
                                     |
QUESTIONS                          ANSWERS

342——*  X-START POS.

Y-START POS.

B-POSITION

X-STROKE

X-FEED RATE

R-OFFSET SEC.

FACE ANGLE

RADIUS  /  OFF - 0  /  ON - 1

RADIUS

NO. OF FLUTES

FIG. 29

STEP    STA 6
RAD. RLV.

QUESTIONS            340
                      ANSWERS

342——* X-RETURN POINT

X-FWD POINT

Z-DEPTH

Z-START

Y-CROSS SLIDE POS.

A-WHEEL ANGLE

R-OFFSET

HELIX ANGLE

RADIAL ANGLE

DIAMETER

NO. OF FLUTES

X-FEED RATE

R-HIGH DWELL PERIOD

FIG. 30

STATION 3 CYCLE CHART

TOOL UNLOADING MECHANISM FOR AUTOMATIC TOOL GRINDING MACHINE

This application is a division of application Ser. No. 524,443, filed Aug. 18, 1983, now U.S. Pat. No. 4,608,643.

FIELD OF THE INVENTION

This invention relates to an unloading mechanism for an automatic tool grinding machine having computerized control. The machine is particularly well adapted for grinding twist drills and other fluted tools such as taps and reamers, for example, but is also adapted for grinding other tools.

BACKGROUND OF THE INVENTION

In certain aspects, the present invention may be regarded as a further improvement upon the tool grinding machine disclosed and claimed in the Breitenstein and Holecek U.S. Pat. No. 4,068,414, issued Jan. 17, 1978.

OBJECT OF THE INVENTION

One object of the present invention is to provide a machine having a new and improved unloader which receives the finished drills or other tools, while holding each drill individually and out of contact with other drills, to prevent from scratching each other.

SUMMARY OF THE INVENTION

To accomplish this and other objects, the present invention may provide an unloading mechanism for a tool grinding machine for grinding drills or other tools, such mechanism comprising a chuck for holding a tool, a turret having a plurality of angularly spaced openings for receiving successive finished tools from such chuck, a carriage for supporting such turret, means for rotatably mounting such turret on such carriage, detent means for detaining such turret with the successive openings in an unloading position to receive the successive finished tools, means for supporting such carriage for reciprocating movement relative to such chuck, power means for causing reciprocating movement of such carriage in opposite directions to move such unloading position into and out of alignment with such chuck, means for ejecting a tool from such chuck into the opening at such unloading position, and indexing means operative upon such reciprocating movement of such carriage in one direction for indexing such turret through one angular step to bring the next opening into the unloading position, such indexing means including a ratchet wheel on such turret, a pawl positioned for engagement by such ratchet wheel upon such reciprocating movement of such carriage in one direction for advancing such ratchet wheel to index such turret through one angular step, a stationary pivot supporting such pawl for swinging movement, biasing means for biasing such pawl into the path of such ratchet wheel, and stop means for limiting the swinging movement of such pawl under the biasing action of such biasing means.

BRIEF DESCRIPTION OF THE DRAWINGS

Further objects, advantages and features of the present invention will appear from the following description, taken with the accompanying drawings, in which:

FIG. 9 is an elevational section of the A-axis drive for swinging or swiveling the first or Z-axis grinding motor, shown in FIG. 1.

FIG. 10 is a horizontal view, partly in section along the line 10—10 in FIG. 9.

FIG. 14 is a side elevation of the second or V-axis grinding unit for the machine, this view also being applicable to the third or B-axis grinding unit.

FIG. 15 is a fragmentary plan view of the V-axis grinding unit.

FIG. 16 is an elevational view thereof, partly in section along the line 16—16 in FIG. 15.

FIG. 17 is a plan view of the unloader or receiving device for receiving the completely ground drills or other tools.

FIG. 18 is an elevation of the unloader.

FIG. 19 is a vertical section, taken generally along the line 19—19 in FIG. 18.

FIG. 20 is a horizontal section, taken generally along the line 20—20 in FIG. 19.

FIG. 24 is an elevation showing the questionnaire page which is brought up initially on the TV tube in the control system.

FIGS. 25-30 are the questionnaire pages brought up on the TV tube for Stations or Operations 1-6 respectively, of the machine, each station or operation constituting a series of movements of the machine drives and components to carry out a particular portion of the grinding of the drill or other tool.

FIGS. 31-36 are program or cycle charts representing typical programming of the control system for Stations 1-6, respectively, the cycle chart for Station 2 being divided between FIGS. 32 and 32a.

DETAILED DESCRIPTION OF AN ILLUSTRATIVE EMBODIMENT

Figure 1:
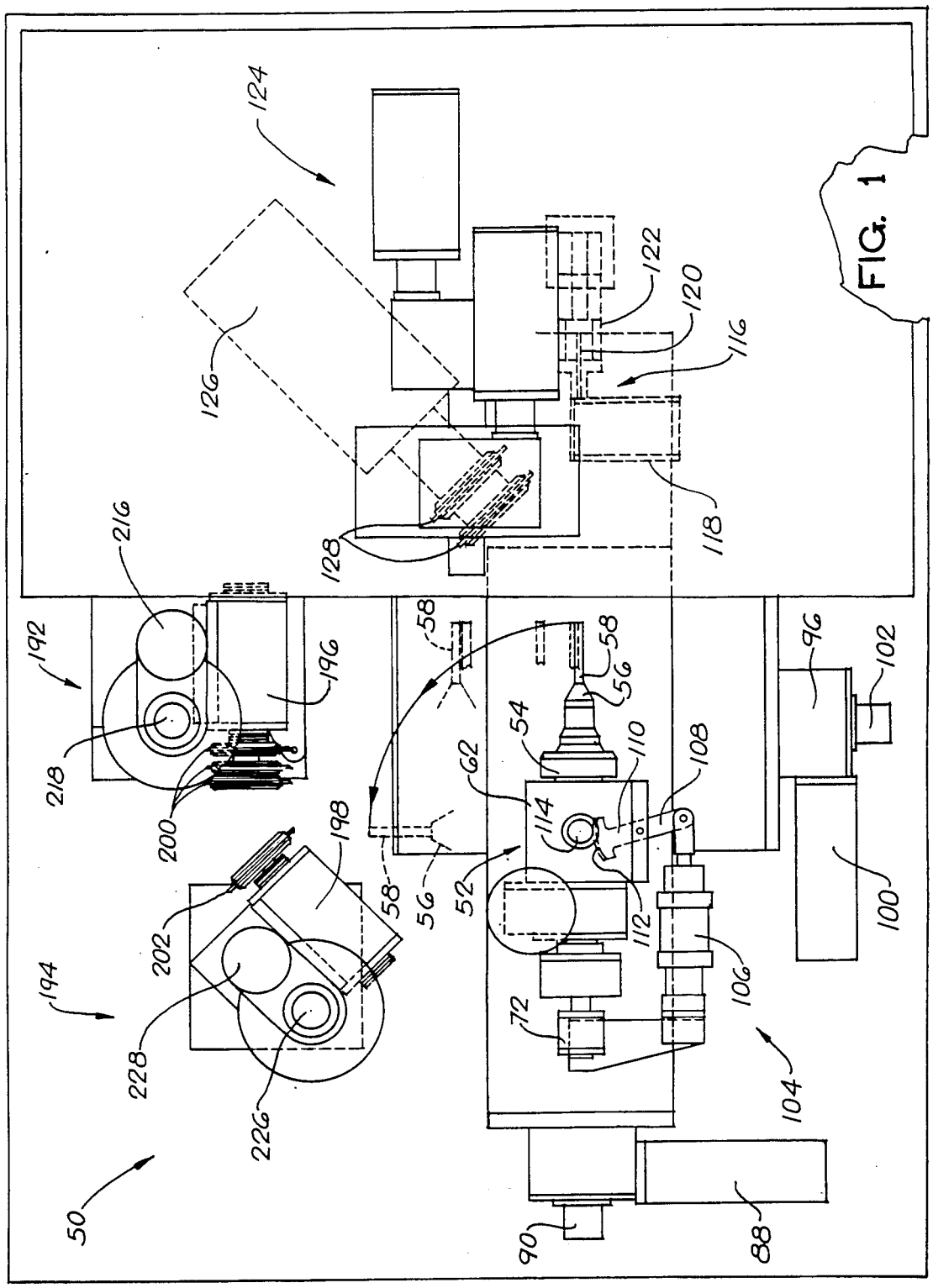
FIG. 1 is a somewhat diagrammatic general plan view of an automatic tool grinding machine to be described as an illustrative embodiment of the present invention.
Figure 2:
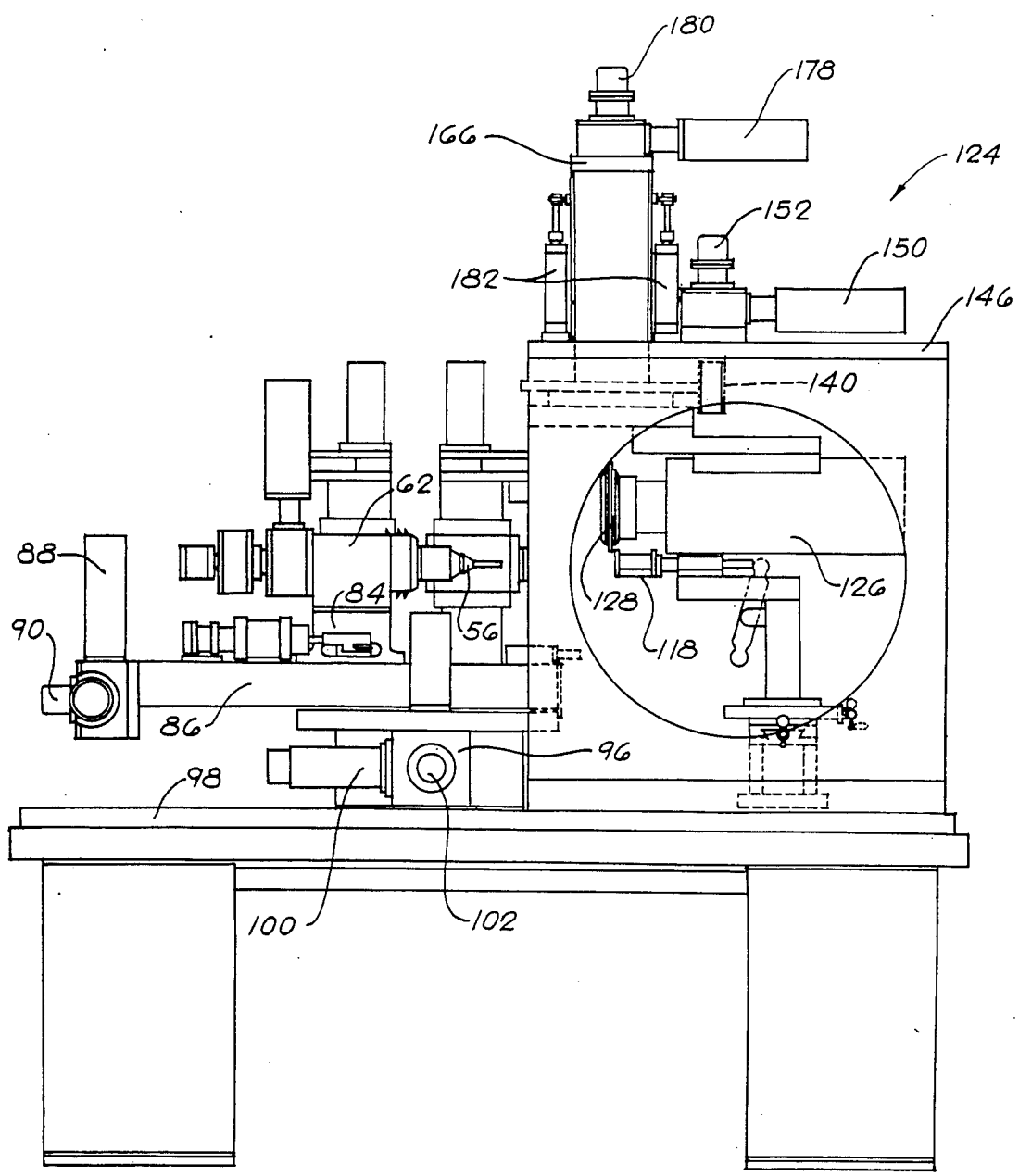
FIG. 2 is a front elevational view of the machine.
Figure 3:
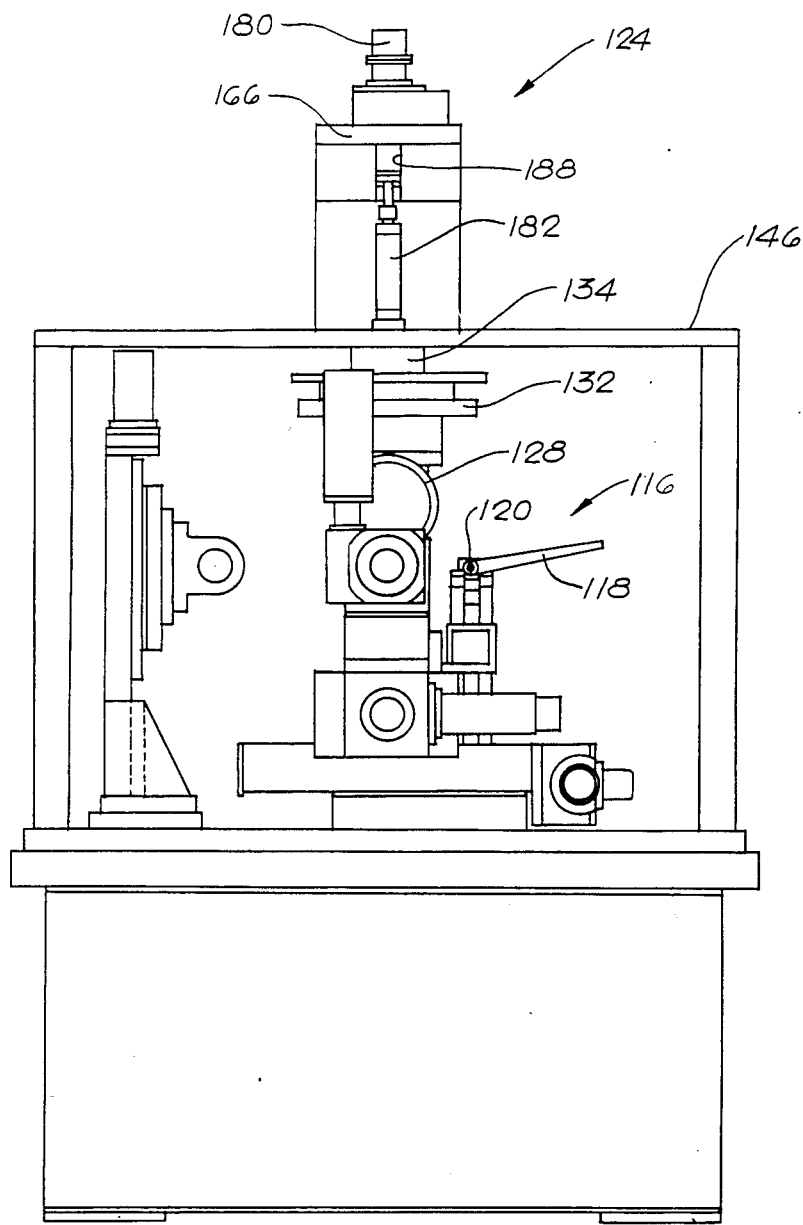
FIG. 3 is a left side elevational view thereof.

FIGS. 1-3 constitute general plan and elevational views of a tool grinding machine 50 to be described as an illustrative embodiment of the present invention. The machine 50 will also be referred to as a drill grinding machine, because it is most useful for grinding twist drills and other similar tools having flutes which are generally spiral or helical in configuration. The machine 50 is capable of performing all of the grinding operations on a twist drill or other tool under full automatic control. Moreover, the drill grinding machine 50 is readily programable, so that the various angular and linear dimensions of the completed drill can be easily established and changed, as needed or desired.

The tool grinding machine 50 comprises a spindle head 52 having a spindle 54 which is rotatable about a horizontal axis. The spindle 54 carries a collet chuck 56 for supporting a tool 58 which is to be ground. The tool or workpiece 58 may be in the form of a drill blank which may comprise a length of cylindrical drill rod. Rotation of the tool 58 about the horizontal axis of the spindle 54 will sometimes be referred to as R-axis movement. The tool 58 is rotated during the grinding operation to produce spiral or helical flutes and to position the tool for other grinding operations which are related to the positions of the flutes.

Figure 5:
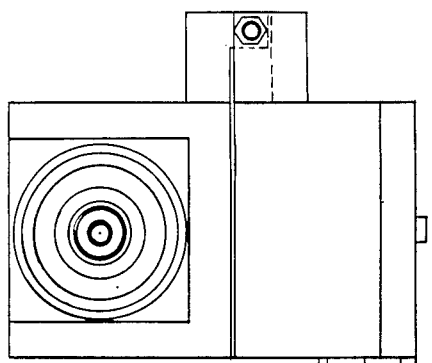
FIG. 5 is a right side elevational view of the spindle head.
Figure 4:
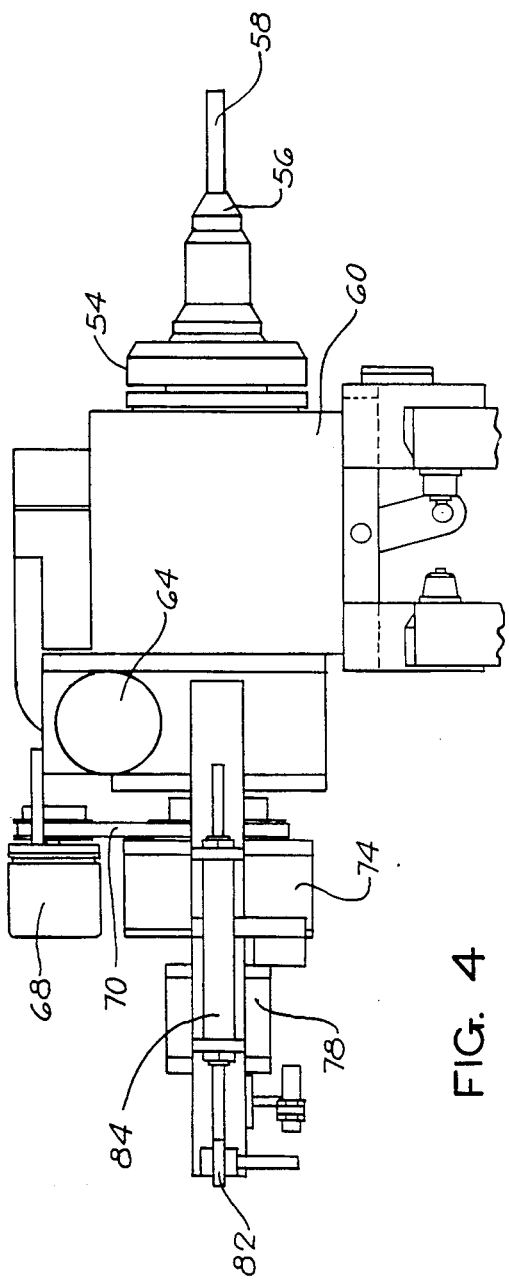
FIG. 4 is an enlarged plan view of the spindle head for the machine.
Figure 6:
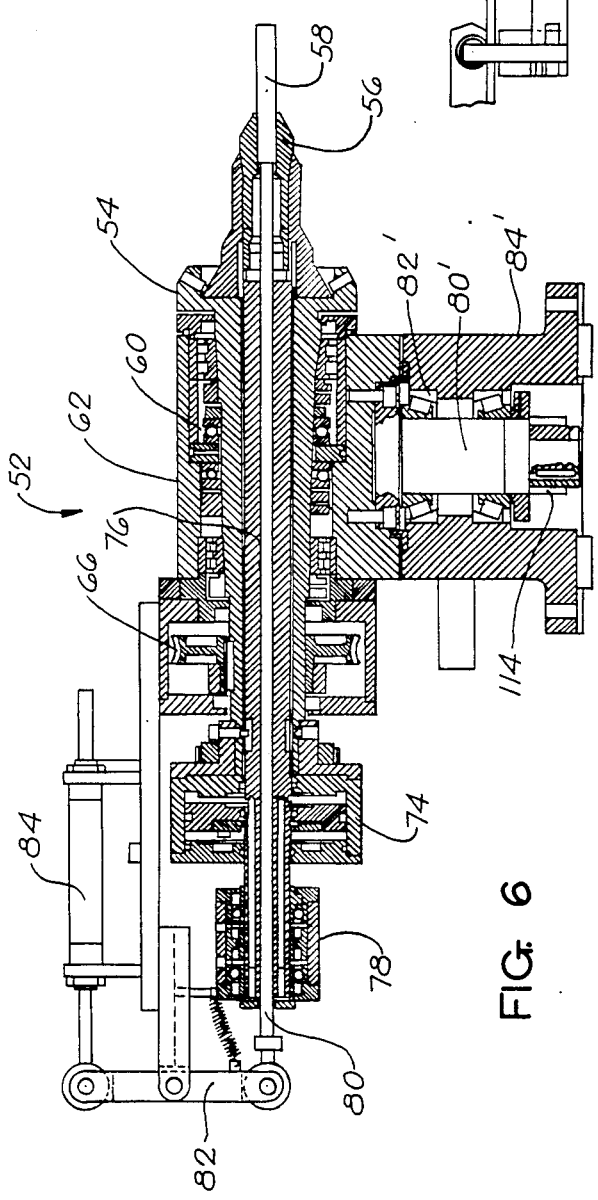
FIG. 6 is an elevational section, taken longitudinally through the spindle head.

FIGS. 4, 5 and 6 show additional details of the spindle head 52. The spindle 54 is rotatably supported by a bearing assembly 60 in a spindle housing 62. The spindle 54 is adapted to be rotated by a servomotor 64 which drives a worm wheel 66, rotatable with the spindle 54. A rotary encoder 68 is driven by the spindle 54 to produce digital signals which indicate the rotary or angular position of the spindle 54. As shown in FIG. 4, the encoder 68 is coupled to the spindle 54 by a precision drive 70 which may utilize a toothed belt or chain. An alternate encoder arrangement utilizing an encoder 72, directly driven by the spindle 55, is shown in FIG. 1.

As shown in FIG. 6, the collet chuck 56 may be opened and closed by a fluid power cylinder 74, operable by air or hydraulic pressure. The fluid power cylinder 74 is coaxially mounted on the rear end of the spindle 54. It will be seen that the spindle 54 is hollow to receive an axially slidable shaft 76, operable by the fluid power cylinder 74 and adapted to open and close the collet chuck 56. Air or hydraulic fluid to operate the cylinder 74 is supplied to the cylinder 74 by a swivel coupling device 78.

The tool 58 may be ejected from the collet chuck 56, when it is opened, by a push rod 80 slidable within the shaft 76, which is hollow to accommodate the push rod 80. It will be seen that the push rod 80 is operable by a rocker 82 which in turn is operable by a fluid power cylinder 84, adapted to be operated by air or hydraulic pressure.

The spindle head 52 is mounted for swivelling or indexing movement about a vertical axis, and also for sliding or translatory movement on two horizontal axes at right angles to each other. Such horizontal axes will be referred to as the x-axis and the y-axis.

As shown in FIG. 6, the spindle housing 62 is fitted with a downwardly projecting swivel shaft 80' which is rotatably supported by a bearing assembly 82' mounted in a carriage housing 84'. It will be seen from FIG. 2 that the carriage housing 84' is mounted on an x-axis carriage 86 which is slidable from left to right, as shown in the front view of FIG. 2. The x-axis carriage 86 is driven by a servomotor 88, and the movement of the carriage 86 is monitored by a rotary encoder 90 which provides digital signals, indicating the position of the x-axis carriage 86.

Figure 7:
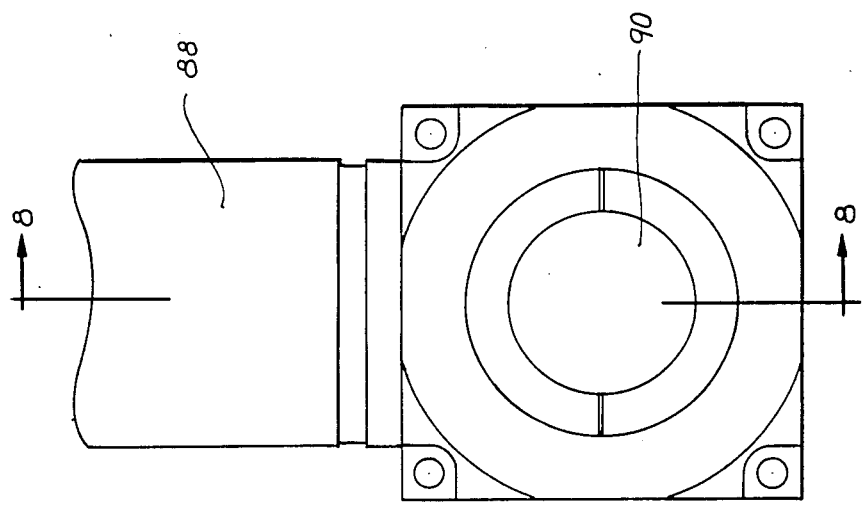
FIG. 7 is a fragmentary elevational view of the X-axis drive for moving the spindle of FIG. 6 longitudinally, when in the position of FIG. 1, FIG. 7 also being illustrative of the Y-axis drive.
Figure 8:
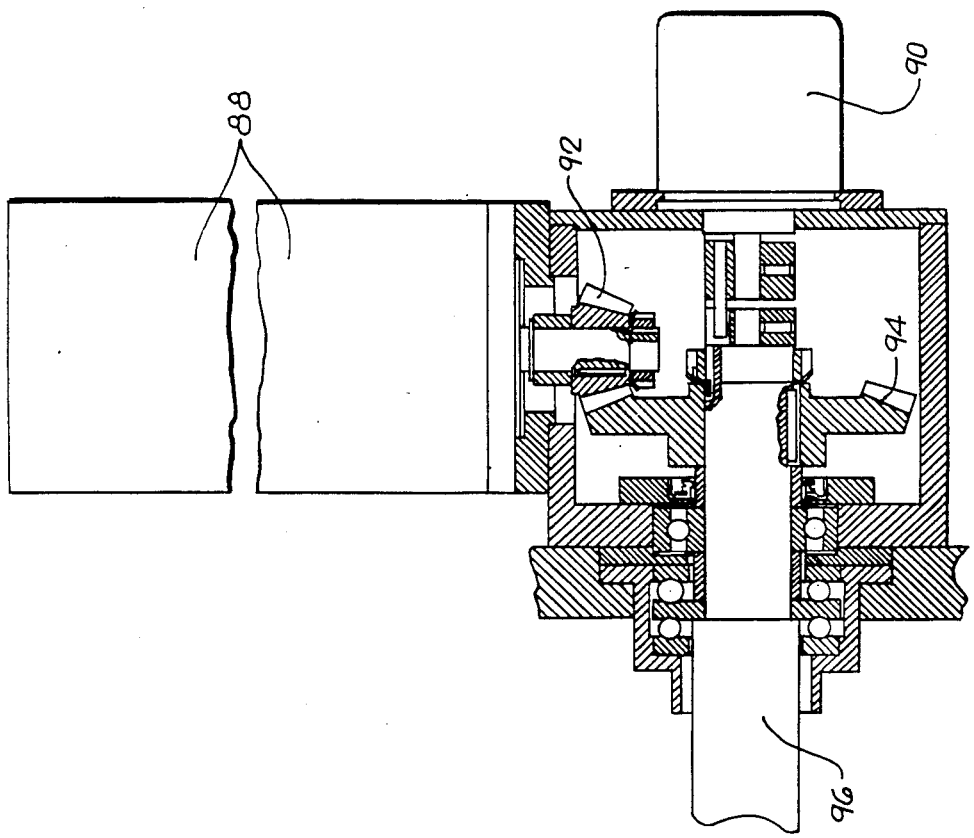
FIG. 8 is a fragmentary elevation, partly in section along the line 8—8 in FIG. 7.
Figure 11:
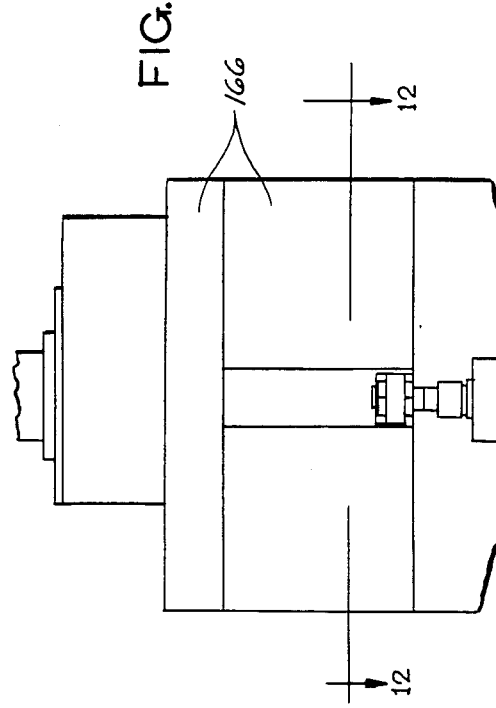
FIG. 11 is a fragmentary elevation of the Z-axis drive for feeding the first grinding motor vertically.

Additional details of the x-axis drive are shown in FIGS. 7 and 8. It will be seen that the servomotor 88 is coupled by means of bevel gears 92 and 94 to a rotatable feed screw 96 which causes sliding movement of the x-axis carriage 86. The encoder 90 is directly coupled to the feed screw 96. The servomotor 88 is shown in a vertical position in FIG. 2, but it may alternately be positioned in a horizontal position, as shown in FIG. 1.

To provide for the y-axis movement, the x-axis carriage 86 is supported by a cross slide or y-axis carriage 96 which is movable from front to rear, as viewed in the front view of FIG. 2. The y-axis carriage 96 is slidably supported by a main base or table 98. The y-axis carriage 96 is driven by a servomotor 100, through a feed screw drive which may be similar to the x-axis drive of FIGS. 7 and 8. The movement of the y-axis carriage 96 is monitored by a rotary encoder 102 which provides digital signals to indicate the position of the y-axis carriage 96.

As shown in FIG. 1, the initial or forward position of the tool 58 is shown in full lines. FIG. 1 also shows a series of translated positions of the tool 58 in broken lines, as the y-axis carriage 96 is moved rearwardly along the y-axis.

In FIG. 1, the swivelling movement of the spindle head 52 is also indicated by a broken line position of the tool 58, in which the tool 58 is directed rearwardly, rather than to the right, as shown in its full line position.

As shown in FIG. 1, a drive 104 is provided for producing swivelling movement of the spindle head 52 between its two positions at right angles to each other. As shown, the drive 104 comprises a fluid power cylinder 106, operable by air or hydraulic pressure. The fluid power cylinder 106 operates a lever 108 having an arm 110 formed with a gear sector 112 which meshes with a small gear or pinion 114 mounted on the spindle head 52. The gear 114 is also shown in FIG. 6.

The operation of the fluid power cylinder may be controlled electrically by a conventional solenoid valve which controls the supply of pressure fluid to the cylinder 106, in a manner which is well known to those skilled in the art. The position of the swingable spindle head 52 is monitored by conventional limit switches which provide electrical signals to indicate whether the spindle head 52 is swung into its x-axis position, as shown in full lines in FIG. 1, or into its y-axis position, as indicated by the broken line positions of the tool 58 and the chuck 56 in FIG. 1.

Similarly, the fluid power cylinders 66 and 84 are controlled electrically by means of conventional solenoid valves. Limit switches are employed to provide electrical signals which indicate whether the collet chuck 56 is open or closed, and whether the cylinder 84 is being operated to advance or retract the push rod 80 which ejects the tool 58 from the collet chuck 56.

As shown in FIGS. 1, 2 and 3, an automatic feeder or loader 116 is provided to load a new tool or drill blank 58 into the collet chuck 56 at the beginning of the cycle of grinding operations The loader 116 comprises a magazine 118 for receiving a supply of the tools or drill blanks 58. The magazine 118 is in the form of an inclined channel-shaped tray along which the drill blanks 58 are adapted to roll downwardly into a position aligned with the collet chuck 56. For loading, the x-axis servomotor 88 is operated to move the x-axis carriage 86 to the right, from the position shown in FIG. 2, so as to position the collet chuck 56 adjacent the magazine 118. The lowermost drill blank 58 in the magazine 118 is then pushed into the collet chuck 56 by a push rod 120 operated by a fluid power cylinder 122 under the control of an electrically operated solenoid valve. Conventional limit switches are employed to provide electrical signals which indicate the position of the fluid power cylinder 122. After the tool blank 58 has been loaded, the push rod 120 is retracted by the cylinder 122 in preparation for the next loading operation. During each loading operation, the cylinder 66 is operated to open the collet chuck 56, so as to receive the drill blank or tool 58, and then to close the collet chuck 56 so as to grasp the tool 58. As shown in FIGS. 1–3, the drill grinding machine 50 comprises a first or main grinding unit 124 which is generally employed to grind the flutes on the tool 58. The grinding unit 124 may also be employed for other grinding operations, such as relieving the flutes. The grinding unit 124 comprises an electrically operable grinding motor 126 which directly drives one or more grinding wheels 128 which may have different profiles for carrying out different grinding operations on the tool 58.

The grinding unit 124 comprises means for feeding the grinding motor 126 downwardly and upwardly in a vertical direction along what will be referred to as the z-axis. This movement of the grinding motor 126 regulates the depth of the flutes formed in the tool 58. In addition, the grinding unit 124 comprises means for swinging or swivelling the grinding motor 126 in a horizontal plane about the vertical axis, to determine the angle of the flutes. Such angular movement will be referred to as the a-axis movement. In FIG. 1, the grinding motor 126 is shown in an angular position such as may be employed for grinding the flutes.

Additional details of the main grinding unit 124 are shown in FIGS. 9, 10, 11, 12 and 13. As shown in FIG. 9, the grinding motor 126 is mounted on a supporting plate 130 secured to a swivel head 132 which is rotatable about the lower end of a vertical shaft 134. Thrust bearings 136 are provided between the swivel head 132 and the shaft 134. The swivel head 132 is adapted to be rotated by a drive comprising a large gear 138 mounted on the swivel head 132 and slidably meshing with an elongated pinion 140 secured to a rotatable shaft 142. A bearing assembly 142 is provided between the rotatable shaft 142 and a stationary supporting plate 146. The shaft 142 carries a worm wheel 148 which is driven by a servomotor 150, shown most clearly in FIG. 2. An encoder 152 is directly coupled to the shaft 142 to provide digital signals indicating the position of the swivel head 132.

As shown in FIG. 10, the swivel head 132 is provided with a locking clamp 154 for locking the swivel head in any angular position to which it is adjusted. As shown, the clamp 154 comprises a pair of clamping jaws or levers 156 which are swingable about pins 158 secured to the stationary supporting plate 146. The jaws 156 are engageable with a groove or channel 160 in the swivel head 132. The jaws 156 are operated by a fluid power cylinder 162 pivotably connected between the free ends of the jaws 156. A solenoid valve is provided to control the fluid power cylinder 162. The clamp 154 is released when the servomotor 150 is energized.

Figure 12:
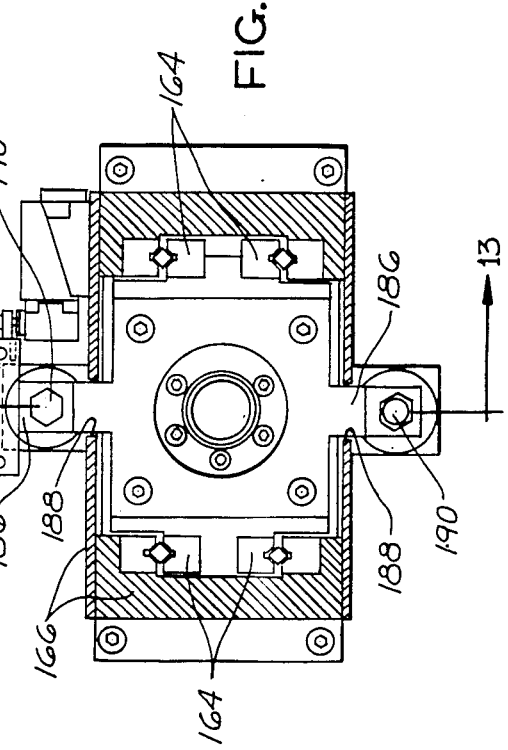
FIG. 12 is a horizontal section, taken generally along the line 12—12 in FIG. 11.
Figure 13:
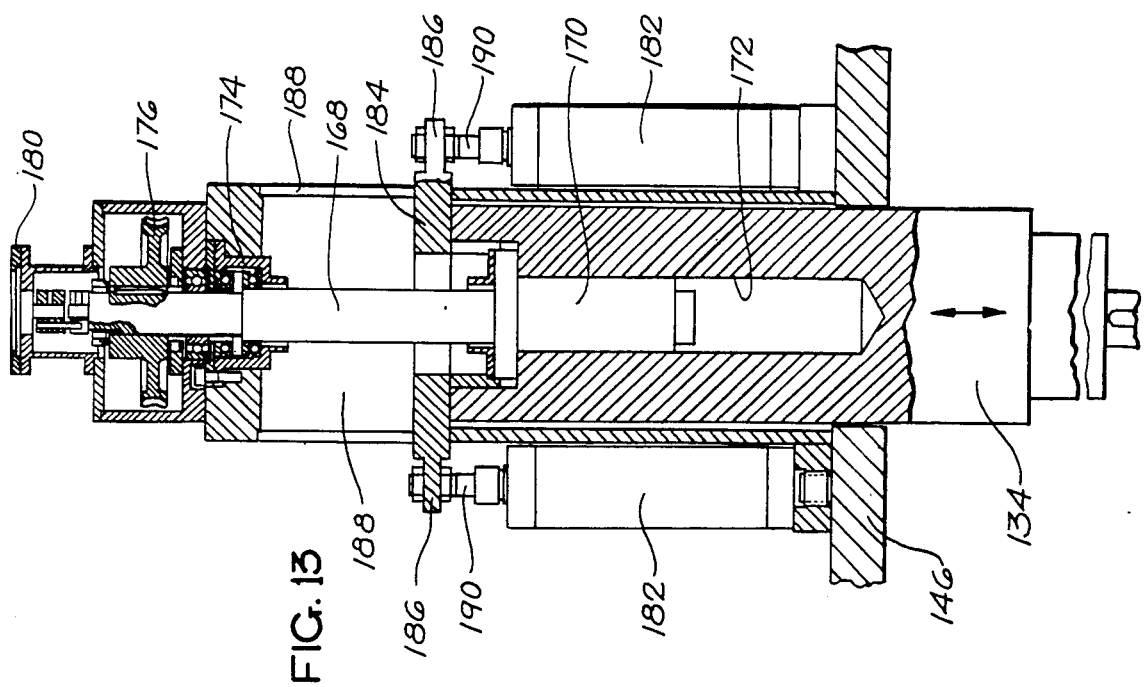
FIG. 13 is an elevational section, taken generally along the line 13—13 in FIG. 12.

The shaft 134, about which the grinding motor 126 and the swivel head 132 are rotatable, to establish the a-axis movement, is movable vertically to establish the z-axis movement. In FIG. 9, the shaft 134 is moved to its uppermost position. In FIG. 13, the shaft 134 is moved to its lowermost position. The vertical movement of the shaft 134 is guided by bearing assemblies 64, as shown in FIG. 12. The bearing assemblies 164 are supported by a rigid frame 166, secured to the stationary plate 146.

The shaft 134 is moved vertically along the z-axis by a rotatable feed screw 168 which engages a ball nut 170, secured to the shaft 134 and telescoped into a bore 172, extending axially within the shaft 134. The feed screw 168 is supported by a thrust bearing assembly 174, mounted in the upper portion of the rigid frame 166. The feed screw 168 is rotated by a drive comprising a worm wheel 176 driven by a servomotor 178, shown in FIG. 2. An encoder 180 is directly driven by the feed screw 168 to provide digital signals which indicate the z-axis movement of the shaft 134 and the grinding motor 126.

The weight of the assembly comprising the grinding motor 126, the swivel head 132 and the shaft 134 is counterbalanced by a pair of fluid power cylinders, preferably air cylinders 182, connected between the stationary plate 146 and a yoke plate 184, secured to the upper end of the shaft 134. Sufficient air pressure is maintained in the cylinders 182 to counterbalance most of the weight of the grinding motor 126 and the associated vertically movable assembly. In this way, the weight borne by the air cylinders 182 does not have to be carried by the feed screw 168 and the ball nut 170, so that they can operate with greater freedom and precision. The yoke plate 184 has arms 186 which extend through slots 188 in the rigid frame 166 and are connected to the piston rods 190 of the air cylinders 182. The lower ends of the air cylinders 182 are secured to the stationary plate 146.

As shown in FIG. 1, the drill grinding machine 50 comprises two additional grinding units 192 and 194 which will be referred to as the V-axis grinding unit 192 and the B-axis grinding unit 194. The grinding units 192 and 194 are employed for performing a variety of additional grinding operations on the drill blank or tool 58. For example, the grinding units 192 and 194 may be employed for grinding the point on the tool 58, relieving the point, facing the point, and gashing or thinning the web formed by the flutes on the tool 58. The grinding units 192 and 194 comprise respective grinding motors 196 and 198 which drive grinding wheels 200 and 202 of various shapes for carrying out a variety of grinding operations. Each of the grinding motors 196 and 198 may carry one or more grinding wheels. As a matter of initial setup, each of the grinding units 192 and 194 may be swivelled about a vertical axis and clamped in its adjusted position, to provide the desired angles between the tool 58 and the grinding wheels 200 and 202. In FIG. 1, the grinding units 192 and 194 are shown adjusted to different angles relative to the tool 58. As to both grinding units 192 and 194, these angles may be adjusted initially as desired.

Each of the grinding units 192 and 194 has a vertically movable drive, so that the respective grinding motors 196 and 198 can be fed vertically relative to the tool 58. The vertical movement of the grinding motor 196 is referred to as the V-axis movement, while the vertical movement of the grinding motor 198 is referred to as the B-axis movement.

FIGS. 14, 15 and 16 illustrate additional details of the vertical drive for the V-axis grinding unit 192. The vertical drive for the B-axis grinding unit 194 is the same, so that separate illustration is not required.

As shown in FIGS. 14 and 16, the grinding unit 192 comprises a supporting column 204 along which the grinding motor 196 is vertically movable. A vertical feed screw 206 is supported on the column 204 by a thrust bearing assembly 208. The feed screw 206 engages a ball nut 210 to which the grinding motor 196 is connected. To feed the grinding motor 196 vertically, the feed screw 206 is provided with a rotary drive comprising a large gear 212 mounted on the feed screw 206 and meshing with a pinion 214 on the shaft of a servomotor 216. An encoder 218 is directly coupled to the feed screw 206 to provide digital electrical signals indicating the movement of the grinding motor 196 along the V-axis.

The grinding motor 196 is secured to its vertically movable carriage 220 by clamps 222, so that the motor 196 is adjustable along its longitudinal axis as a matter of initial setup.

In FIG. 1, the servomotor and the motor for the B-axis grinding unit 194 are designated 226 and 228, respectively. They are the same in construction and arrangement as the servomotor 216 and the encoder 218.

The grinding operations which may be carried out on the tool 58 will be described in greater detail presently. After the grinding operations on the tool 58 have been completed, the tool 58 is ejected from the chuck 56 into a receiving device 230, the details of which are illustrated in FIGS. 17-20. The receiving device 230 includes a rotatable cylindrical turret or magazine 232 having a series of bores or openings 234, spaced at equal angular intervals, for receiving the successive tools 58 as they are finished. The bores 234 are formed in one end face of the magazine 232 and are parallel with one another.

The magazine 232 is adapted to be reciprocated between an advanced position, in which it is adapted to receive a completed tool 58, and a retracted position, in which it is moved at right angles to the center line of the chuck 56, away from alignment with the chuck. In FIGS. 17 and 18, the magazine 232 is shown in its advanced position. The magazine 232 is supported for reciprocating movement by a carriage 236 comprising upper and lower slidable rods 238 and 240. The upper rod 238 is the piston rod of a fluid power cylinder 242 which may be operated by air or hydraulic fluid under pressure.

When the magazine 232 is retracted by the fluid power cylinder 242, the magazine 232 is automatically indexed through one angular step, corresponding to the angular interval between the bores 234. Thus, when the magazine 232 is again advanced by the cylinder 242, the next bore 234 is presented to receive the next tool 58. The indexing of the magazine 232 is accomplished by a pawl 244 which engages a ratchet wheel 246 secured to the magazine 232, on the opposite end thereof from the bores 234. When the magazine 232 is retracted, the ratchet wheel 246 engages the pawl 244 and is advanced through a step corresponding to the angular interval between the teeth of the ratchet wheel. The pawl 244 is stationary with respect to translatory movement, but is swingable through a limited range about a pivot 248. A spring 250 is provided to bias the pawl 244 against an adjustable stop screw 252.

As shown in FIGS. 19 and 20, the magazine 232 is rotatably mounted on a shaft 254 by means of a bearing assembly 256. The shaft 254 is secured to the carriage 236. The magazine 232 is accurately located in each of its indexed positions by detent means comprising a pair of detent balls 258 which are pressed by springs 260 into detent recesses 262, formed in the exposed end face of the ratchet wheel 246. The entire receiving device or unloader 230 is supported by a rigid stationary bracket 264.

It will be seen that the feeder or loader 116 is shown in the background in FIG. 18. The tray or magazine 118 of the feeder 116 and the push rod 120 are clearly shown. When the feeder 116 is being used, the magazine 232 of the unloader 230 is retracted to the right by the fluid power cylinder 244 so that the magazine 232 is out of the way of the feeder 116.

Figure 21:
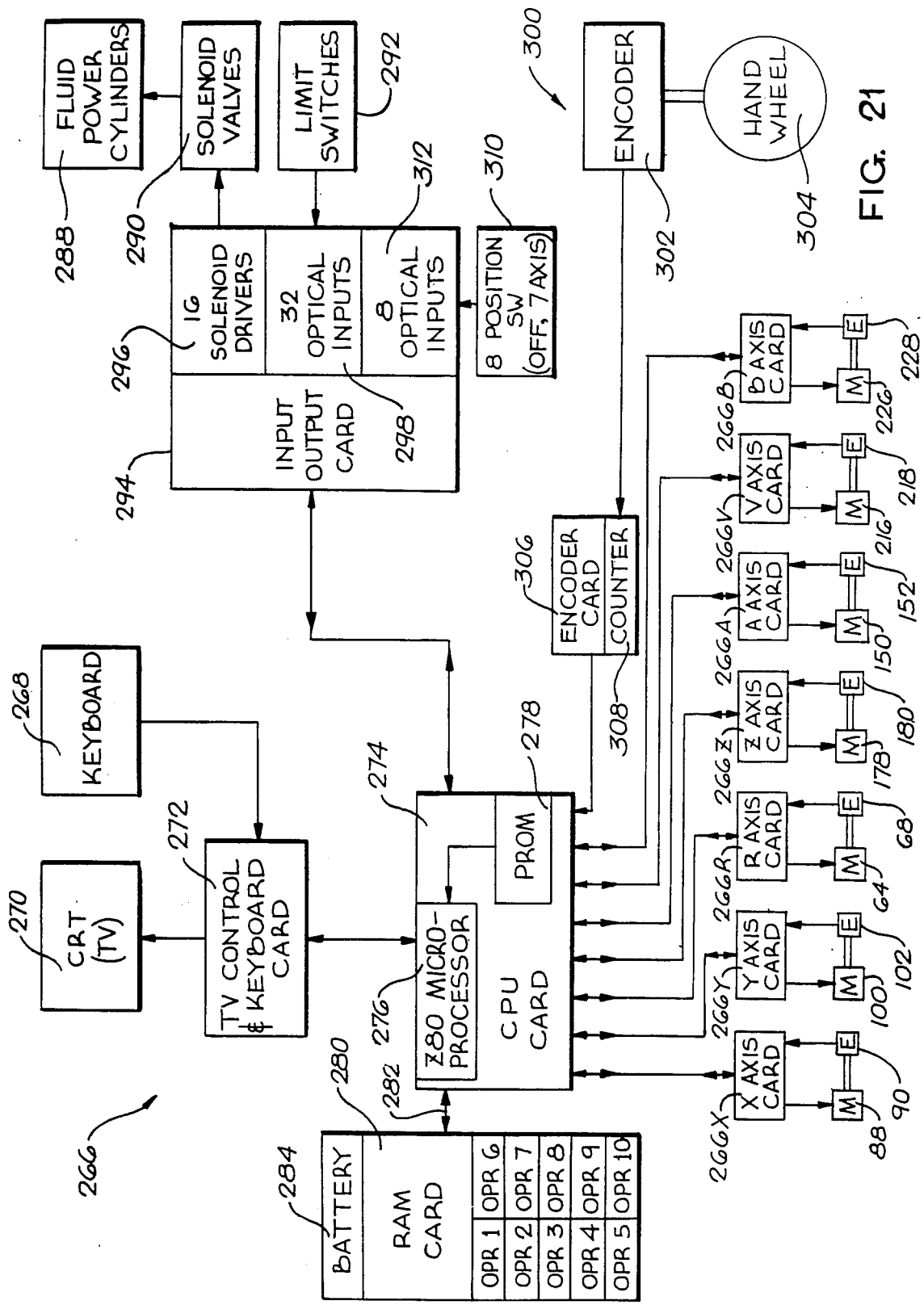
FIG. 21 is a schematic diagram of the computerized control system for the automatic tool grinding machine.

As shown in FIG. 21, the tool grinding machine 50 is automatically controlled by a computerized or microprocessor control system 266 which causes all of the servomotors and the fluid power cylinders to be operated in an elaborate control sequence, so as to carry out a series of grinding operations on the tool 58. The tool loading and unloading functions are also controlled by the control system 266. During each grinding operation, the pertinent servomotors are operated to move the seven axis drives between starting and final positions, to achieve dimensional control of the grinding operations with a high degree of precision. The position of each drive is detected or sensed by the corresponding encoder, which produces digital electrical signals to indicate the position of the drive. The corresponding servomotor is operated until the dimensional value indicated by the encoder corresponds exactly with the pertinent dimensional value stored in the computerized control system 266. The stored dimensional values are fully programmable by operating a keyboard 268 during an an elaborate setup process, which will be described in detail presently. The values entered by the keyboard 268 are displayed on a TV or CRT (cathode ray tube) 270, which makes it easy to set up the machine. The keyboard 268 and the TV tube 270 are connected to a TV control and keyboard card 272 which includes any known or suitable character generator, so that the values entered by the keyboard 268 will be displayed on the TV tube 270.

The computerized control system 266 employs computer components which are well known to those skilled in the art of computerized control systems. Thus, the control sytem 266 comprises a central processing unit (CPU) or host computer 274 which utilizes a Z80 microprocessor integrated circuit or chip 276. The CPU 274 also includes a programmable memory (PROM) 278 in which the operating sequence and other program information are stored. The dimensional values for the various operating sequences are stored in a separate random access memory (RAM) card 280 which is connected to the CPU 274 by a cable 282. The RAM 280 has sufficient storage capacity to store the dimensional values for a large number of grinding operations. During the sequence of operations, the CPU 274 calls upon the RAM 280 to supply the successive dimensional values for each of the grinding operations. The RAM 280 receives its operating power from a battery 284 so that the dimensional values stored in the RAM 280 will not be lost if there is an electrical power failure.

It will be recalled that the tool grinding machine 50 has seven drive axes, referred to as X, Y, R, Z, A, V and B. For each drive axis there is a servomotor and an encoder. As shown in FIG. 21, the control system 266 includes seven drive axis cards 286X, 286Y, 286R, 286Z, 286A, 286V and 286B, connected between the CPU 274 and the respective servomotors 88, 100, 64, 178, 150, 216 and 226. The respective encoders 90, 102, 68, 180, 152, 218 and 228 are also connected to the respective drive axis cards, as enumerated above. In the elaborate operating sequence of the machine 50, the dimensional values to be achieved by the servomotors are supplied to the drive axis cards by the CPU 274, which derives the values from the RAM 280 under the control of the microprocessor 276 and the PROM 278. It will be recalled that the tool grinding machine 50 comprises a number of fluid power cylinders 74, 106, 122, 162 and 242. In FIG. 21, all of the fluid power cylinders in the machine 50 are represented by a single block 288. All of the corresponding solenoid operated valves and limit switches ae represented by blocks 290 and 292. An input-output card 294 is connected between the CPU 74 and the solenoid valves 290 and limit switches 292. The input-output card 294 includes sixteen solenoid drivers 296 which are more than enough to handle the solenoid valves 290. The input-output card 294 also includes thirty-two optically coupled inputs 298 which are more than enough to service the limit switches 292. The signals to operate the solenoid valves 290 are supplied by the CPU 274 to provide the desired operating sequence under the control of the microprocessor 276 and the PROM 278. The limit switches 292 supply signals to the CPU 274 to indicate that the fluid power cylinders have completed their respective strokes in both operating directions, so that the sequence of operations can proceed.

The control system 266 also includes a pendant control unit 300 which includes an encoder 302 operable by a hand wheel 304. An encoder card 306 is connected between the encoder 302 and the CPU 274. The encoder card 306 includes a counter 308 which registers the position of the encoder 302. The purpose of the encoder 302 is to provide manual control over any of the seven axis drives during thc setup process. To select the drive axis, the pendant control unit 300 also includes an eight position switch 310 which has an OFF position and seven positions for the seven drive axes. The eight position switch 310 is connected to the input-output card 294 which has eight additional optically coupled inputs 312 to service the eight position switch 310.

When it is desired to operate the pendant control unit 300 during the setup process, the switch 310 is operated to the position for the desired drive axis. For example, if the switch 310 is operated to the X-axis position, the hand wheel 304 may be rotated manually to cause corresponding rotation of the X-axis servomotor 88. Similarly, the hand wheel 304 may be employed to produce rotation of any of the other drive axis servomotors. When the desired position of the corresponding drive has been achieved, the corresponding dimension may be stored in the RAM 280 by manipulating the keyboard 268, as will be described in greater detail presently.

Figure 22:
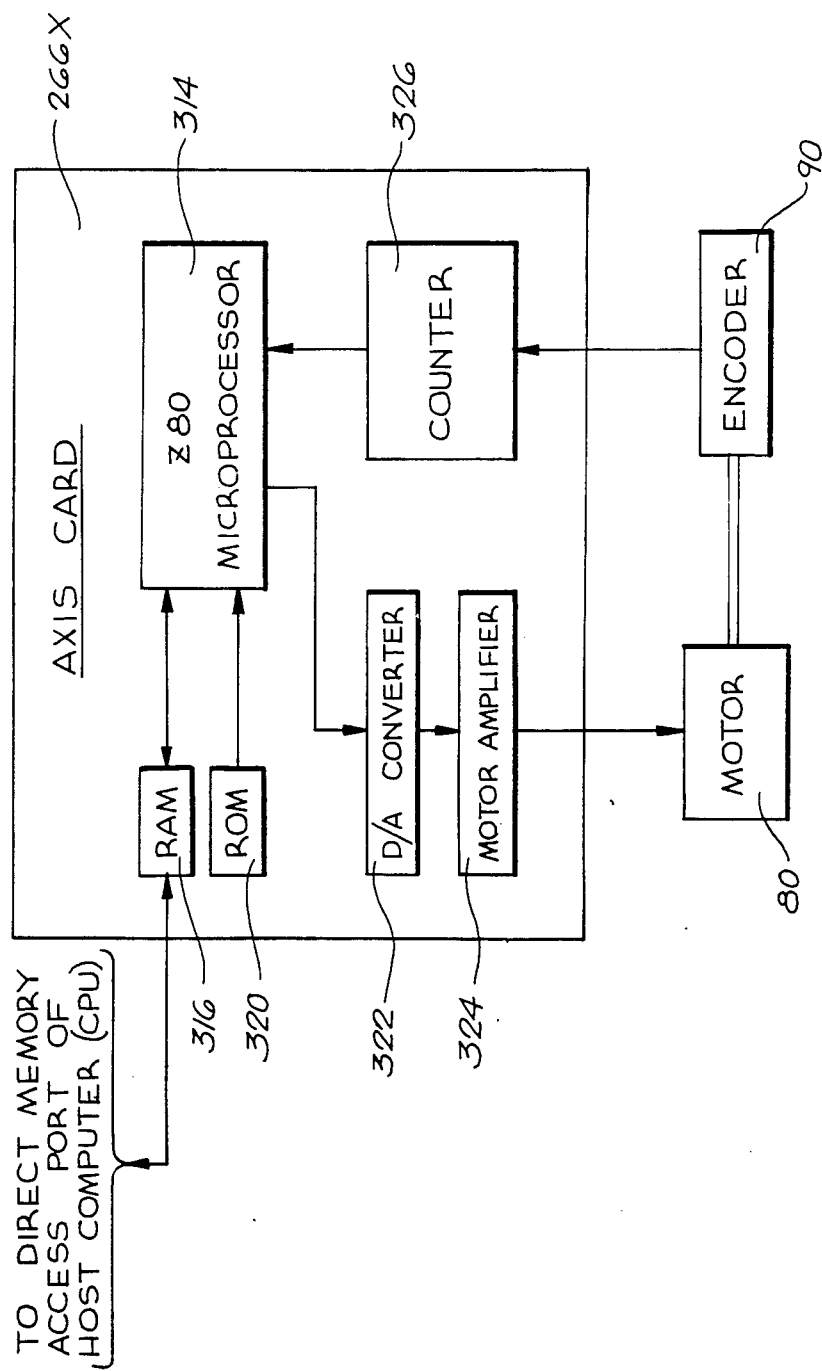
FIG. 22 is a schematic diagram of one of the axis drive control cards for the control system of FIG. 21.

FIG. 22 illustrates additional details of the axis drive card 266X. All of the other axis drive cards 266Y, 266R, 266Z, 266A, 266V and 266B are the same in construction and arrangement as the axis drive card 266X, so that the following description also applies to them. It will be seen that the X-axis card 266X includes its own Z80 microprocessor chip 314 which controls the servomotor 80 and handles the digital signals from the encoder 90. The axis card 266X also has its own random access memory (RAM) 316 which is connected to the microprocessor 314. The RAM 316 receives and stores the sequence commands and dimensional values for each grinding operation from the host computer or CPU 274, so that the grinding operation can be completed by the axis card 266X before another set of sequence commands and dimensional values is received. The RAM 316 has a connecting cable 318 extending to a direct memory access port of the host computer or CPU 274.

The axis card 266X also includes a read-only memory (ROM) 320 which supplies program information of any known or suitable character to cause the microprocessor 314 to operate as a servo system in conjunction with the servomotor 80 and the encoder 90. The microprocessor 314 supplies its servo commands to the motor 80 in the form of digital signals which are converted to analog signals by a digital-to-analog (D/A) converter 322. A motor amplifier 324 is connected between the D/A converter 322 and the motor 80 to amplify the analog signals.

A counter 326 is connected between the encoder 90 and the microprocessor 314 to register the digital signals produced by the encoder 90 to indicate the position of the drive. The microprocessor 314 causes the servomotor 80 to operate until the position signals from the encoder 90 agree with the dimensional values received from the host computer or CPU 274.

Figure 23:
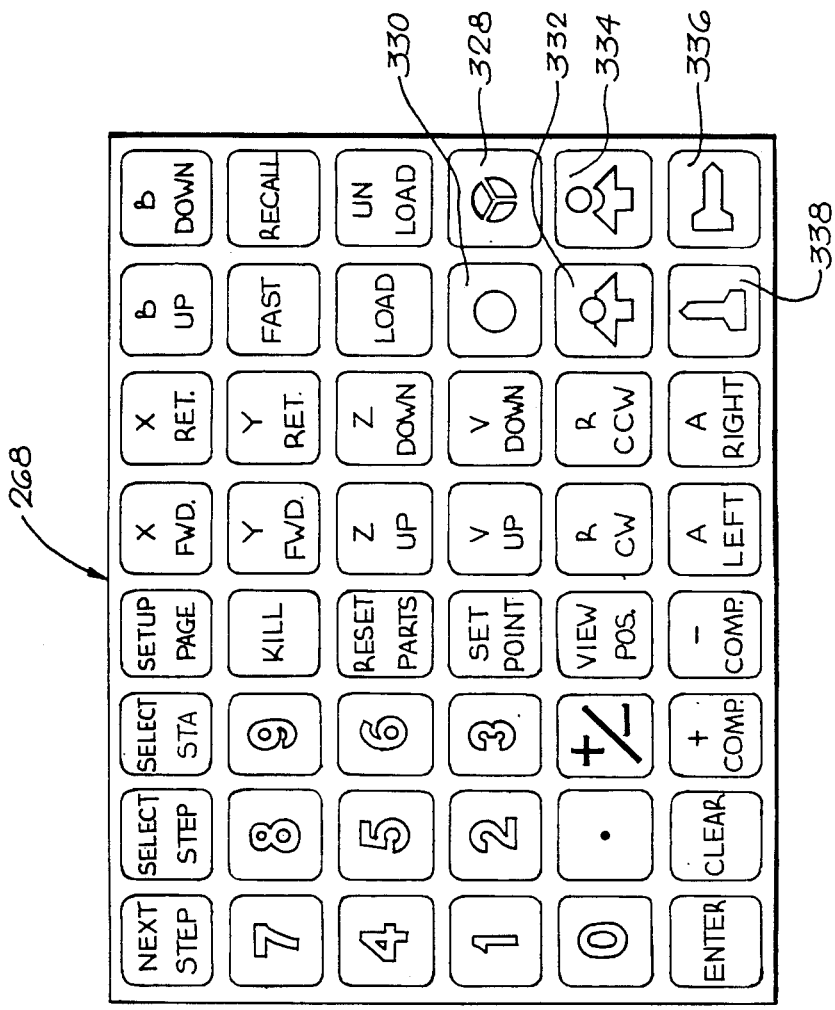
FIG. 23 is an elevation of the control keyboard for the control system.

FIG. 23 illustrates details of the keyboard 268. It will be seen that the keyboard 268 comprises a series of ten numerical keys for entering the numerals 0 through 9, plus a key for entering the decimal point. When the numerical keys are operated, the corresponding numbers are displayed on the CRT or TV tube 270. The keyboard 268 includes an "ENTER" key for causing the displayed number to be entered in the memory afforded by the RAM 280. There is also a "CLEAR" key for clearing the displayed number to zero.

In many cases, the number to be entered is an incremental number, to increase or decrease a dimensional value already in the memory, to compensate for a condition in which the existing dimensional value is too small or too large. To enter such incremental numbers, the keyboard 268 comprises a key labelled "+COMP" and a key labelled "−COMP". The keyboard 268 also includes a sign changing key labelled "+/−".

The keyboard 268 includes a series of keys for jogging the various axis drives. For jogging the x-axis drive, the keyboard 268 includes keys labelled "X FWD" and "X RET", for moving the x-axis drive in the forward and return directions. To jog the y-axis drive, the keyboard 268 includes keys labelled "Y FWD" and "Y RET". For jogging the z-axis drive, the keyboard 268 includes keys labelled "Z UP" and "Z DOWN". To jog the v-axis drive, the keyboard 268 includes keys labelled "V UP" and "V DOWN" Similarly, to jog the b-axis drive, the keyboard 268 includes keys labelled "B UP" and "B DOWN".

For jogging the r-axis drive, the keyboard 268 includes keys labelled "R CW" and "R CCW", for jogging the rotary R-drive clockwise or counterclockwise. To jog the a-axis drive in opposite directions, the keyboard 268 includes keys labelled "A LEFT" and "A RIGHT". The jogging keys normally produce slow speed jogging movement. To produce fast jogging movement, the keyboard 268 includes a key labelled "FAST", which may be pressed prior to depressing one of the jogging keys. When the jogging key is released, the jogging speed automatically clears to slow speed.

The keyboard 268 includes keys labelled "LOAD" and "UNLOAD", to cause the machine to load or unload a tool. Pressing these keys will cause the x and y carriages to move to their loading or unloading positions if they are not already in such positions.

The keyboard 268 also includes a series of keys which are employed in setting up and programming the machine with dimensional values. In the setup process, the PROM 278 and the RAM 280 cause the TV tube 270 to display a series of pages of text, comprising menus or lists of questions, serving as prompts for the operator, as will be described in greater detail presently. The first page is brought up on the TV tube 270 by pressing a key labelled "SETUP PAGE". The setup page includes a series of questions calling for the entry of basic dimensional values. The question to be answered is indicated by a cursor on the TV tube 270. As each answer is entered, the cursor goes to the next question.

Following the setup page, the TV tube 270 displays a series of pages for the successive steps in the grinding process. The word "steps" refers to grinding steps such as fluting, relieving, facing, pointing and the like. Each step is identified by a number. To select any particular step, the operator presses a key labelled "SELECT STEP", followed by the number of the step.

Each step is carried out at one of several stations or operating configurations of the machine. Each station is identified by a number. To select any particular station, the operator presses a key labelled "SELECT STA", followed by the number of the station. The TV tube 270 then brings up a station or operation page comprising a series of questions as to dimensional values. More than one step may be carried out at any particular station, but a separate list of dimensional values will be entered for each step. As each value is entered, the cursor on the TV tube 270 goes to the next question.

The keyboard 268 also includes a key labelled "NEXT STEP", which causes the TV tube 270 to bring up the page of questions for the next step in the sequence of grinding processes.

As to any question or series of questions, the operator may press a key labelled "RECALL", which causes the TV tube 270 to bring up the dimensional value which was previously entered in the memory. The keyboard 268 also includes a key labelled "KILL" which may be pressed to erase the entire program buffer, to make a fresh start in programming. The keyboard 268 also includes a key labelled "RESET PARTS" which may be operated to reset the parts and slow counters.

As previously indicated, any of the axis drives can be jogged to any desired position by operating the jogging keys. An even finer degree of control is available by operating the pendant control unit 300. The 8-position switch 310 is operated to the position for the particular axis drive, such as the x-axis drive. The handwheel 304 is then rotated to change the rotary position of the encoder 302. This causes the servomotor for the particular axis drive to turn by a corresponding amount. In setting up the machine, it is often the practice to adjust one of the axis drives so that the tool 58 just touches the pertinent grinding wheel. For the desired position of the axis drive, the axis encoder produces a numerical value representing that position of the drive. Such numerical value can be viewed by pressing a key on the keyboard 268 labelled "VIEW POS" where "POS" stands for "position" or "positional value". If the operator desires to enter such a positional value in the memory, a key labelled "SET POINT" on the keyboard 268 may be pressed. This is much easier than entering the positional value on the numerical keys of the keyboard 268.

The keyboard 268 also has six keys with pictorial indicia. These pictorial keys include keys 328 and 330 having indicia representing an open chuck and a closed chuck. These keys are employed for opening and closing the chuck 56.

The keyboard 268 also includes keys 332 and 334 having indicia representing a lowered tool rest and a raised tool rest. These keys are employed to lower and raise a conventional tool rest of the V-block type under the tool 58 to support it and prevent it from bending during the grinding operations.

The keyboard 268 also includes keys 336 and 338 having pictorial indicia representing the spindle as swivelled or indexed to its two positions, parallel to the x-axis and parallel to the y-axis, respectively. These keys are employed to cause swivelling movement of the spindle between its two rectangularly related positions, as shown by the full line and broken line positions of the tool 58 in FIG. 1.

FIG. 24 shows the setup page, which is the first in the series of pages or menus of programming questions, brought up on the TV tube 270 by the central processing unit 274, in conjunction with the RAM 280. The setup page includes questions calling for the number of steps, which refers to the total number of steps in the grinding process on the tool or drill blank; the tool tip diameter; the tool length, which refers to the length of the tool from the tip to the base at the point where it is held by the chuck; and the cycle time, which is the time allowed to make the drill or other part. The setup page also inquires whether the automatic loader is to be turned on, in which case a zero is entered, or off, in which case a 1 (one) is entered, to switch the machine to the manual loading mode.

The setup page also calls for the x-axis loading position, the x-axis unloading position, the y-axis loading position, the y-axis unloading position, the loading feed rate, and the distance from the wheel center to the chuck tip. This is the distance from the chuck tip to the centerline of the grinding wheel of the first grinding unit 124 at station 1. This distance is not required to be entered unless the constant helix control is turned on by entering a 1 (one) in response to the next question. Entering a 0 (zero) causes the constant helix controls to be turned off. Finally, the questionnaire calls for the entry of the z-axis return position.

Following completion of the entries on the setup page, the operator presses the key labelled "next step" whereupon the TV tube 270 brings up the legend "SELECT STA", to prompt the operator to select the appropriate station or operation. The operator then enters the desired station number, whereupon the questionnaire or menu for that station will be brought up on the TV tube 270 by the CPU 274.

It will be understood that the details of the questionnaire for the setup page may be varied. This also applies to the details of the questionnaires for the various stations or operations.

As the operator enters the answers to the questions on the setup page and the various other station pages, the answers are displayed on the TV tube 270 in a column 340 opposite the questions. These answers are entered into the memory afforded by the RAM 280. In FIG. 24, the cursor is indicated at 342. The cursor 342 is brought up on the TV tube 270 by the CPU 274. It will be understood that the shape of the cursor may be varied.

FIGS. 25-30 illustrate the pages or questionnaires which are brought up on the TV tube 270 for operations or stations 1-6, respectively. Each step in the grinding process is carried out at only one station. However, a station may be used in more than one step of the grinding process. For example, the steps of fluting and relieving a drill are two separate steps. However, both of these steps may be performed on station or operation 1. Each of these steps requires a separate questionnaire with separate answers. On the two questionnaires, the questions for station 1 will be answered differently for the two steps. The various steps in the grinding process will always occur in numerical sequence, such as steps 1, 2, 3, 4 and so forth. However, the stations or operations can be selected in any order to satisfy the machining requirements of the various steps.

It will be seen that FIG. 25 illustrates the questionnaire page which is brought on the TV tube 270 for station or operation 1. This station involves the use of the first grinding unit 124 and is employed for grinding flutes in the tool or drill 58, and for relieving such flutes. Grinding and relieving are two separate steps in the grinding process. The heading on this page has a blank for the step number. Moreover, the heading indicates in abbreviated form that station 1 is employed for fluting and relieving. This station is usually employed first in the grinding process.

As shown in FIG. 25, the questionnaire for station 1 calls for the Z-DEPTH (−DEEP) which is the depth of the flutes, as controlled by the z-axis drive which moves the pertinent grinding wheel 128 down, so that it grinds into the tool 58. The reference to (−DEEP) tells the operator that the key labelled −COMP must be used to cut deeper into the tool 58. This depth dimension should be set at the outside diameter of the tool 58 initially, and then should be made deeper in accordance with the desired flute depth.

The next question calls for "R-OFFSET", which is the amount of rotational offset which is imparted to the tool 58 at the beginning of the grinding step. Normally, this dimension will be left at zero, for the grinding of the first flute.

The questionnaire of FIG. 25 then asks for the "X-FEED RATE" which is the x-axis feed rate; and the "X-RETURN POINT", which is the point to which the x-axis drive returns, after the first flute or other cut is finished and the tool is being rotated or indexed to the rotational offset for the second flute. A small gap should be allowed between the tool and the grinding wheel, for the x-axis drive to come up to speed before the tool contacts the grinding wheel. The questionnaire also calls for the "X-FORWARD POINT", which is the point to which the x-axis drive feeds the tool in relation to the grinding wheel. This dimension determines the length of the flute.

The station 1 questionnaire of FIG. 25 also calls for the "Y-CROSS SLIDE POS." which is the position of the y-axis slide or carriage during the machining of the flutes or the like. Next, the questionnaire calls for the "HELIX ANGLE" at which the flute is ground. The helix angle for relieving may be slightly different from the helix angle for fluting, in order to compensate for web taper. The questionnaire then calls for the number of flutes to be machined.

The station 1 questionnaire of FIG. 25 then calls for the "SMALL DIA.", the "LARGE DIA.", and the "TAPER LENGTH". These parameters are used to establish the taper of the flutes. As the grinding of the flutes progresses from the tip of the drill toward the shank of the drill, the taper begins at the small diameter of the web and ends at the large diameter. The taper reduces the depth of the flutes. The CPU 274 characterizes the taper angle from these three parameters, the small diameter, the large diameter and the taper length, which is the distance between the small and large diameters at the opposite ends of the taper.

Next, the station 1 questionnaire of FIG. 25 calls for the "A-WHEEL ANGLE" which is the adjusted angle of the pertinent grinding wheel 128 in degrees. The questionnaire then calls for the entry of a 0 (zero) for slow clockwise rotation of the grinding wheel; a 1 (one) for fast clockwise rotation; a 2 (two) for slow counterclockwise rotation; or a 3 (three) for fast counterclockwise roation. The next line of the questionnaire calls for the entry of a 0 for the grinding of right hand flutes; a 1 for left hand flutes; or a 2 for straight flutes.

The station 1 questionnaire of FIG. 25 next calls for the "R-RETURN OFFSET" which is the rotational offset angle of the tool 58 for the second flute, if any, and the "X-RETURN FEED RATE" which is the feed rate at which the x-axis drive is returned to the position for starting the second flute. If a second flute is to be ground, the operations at station 1 are repeated.

As previously indicated, FIG. 26 illustrates the page or questionnaire which is brought up on the TV tube 270 for station or operation No. 2. This station is generally used for secondary relieving of the flutes, but may also be used for primary relieving in some cases. For this station, the spindle head 52 is swivelled so that the tool 58 is parallel to the y-axis, rather than parallel to the x-axis, as it was for station No. 1. The second grinding unit 192 is used, but the grinding wheel remains stationary and is not fed for station No. 2. Instead, the tool 58 is fed into the pertinent grinding wheel 200 by using the x-axis and y-axis drives. The depth of the cut is determined by the x-axis drive, while the y-axis drive is employed to feed the tool 58 along its axis, relative to the grinding wheel. To relieve helical flutes, the r-axis drive is employed to rotate the tool 58, as the tool is being fed by the y-axis drive.

As shown in FIG. 26, the questionnaire for station or operation 2 has a blank space for the step number. The heading indicates that the station is used for primary or secondary relieving.

The station 2 questionnaire of FIG. 26 begins by calling for the "X-DEPTH (−DEEP)-SEC.", which means the x-axis drive position to achieve the desired depth for secondary relieving. The legend "(−DEEP)" means that the key labelled "−COMP" is used to increase the depth incrementally. The questionnaire then calls for "R-OFFSET-SEC." which refers to the rotational offset of the R-axis drive to begin secondary relieving. The questionnaire then calls for the "Y-FEED RATE SEC", which refers to the feed rate of the y-axis drive for secondary relieving.

The station 2 questionnaire of FIG. 26 then asks the same three questions for primary relieving. These are the questions calling for the x-depth for primary relieving, the r-offset for primary relieving, and the y-feed rate for primary relieving.

Next, the station 2 questionnaire of FIG. 26 calls for the "Y-FORWARD POINT" and the "Y-RETURN POINT", which are the points at which the y-axis drive is stopped feeding the tool into the grinding wheel, and the point to which the y-axis drive is to return the tool, when the grinding cut has been completed, in preparation for another cut. A small amount of space should be left between the tool and the grinding wheel for the y-axis drive to come up to speed when another cut is begun.

The station 2 questionnaire of FIG. 26 then calls for the helix angle and the number of flutes to be relieved. Then, the questionnaire asks for the small diameter, the large diameter and the taper length, which are the three parameters needed for causing the x-axis drive to taper the depth of the cut, as explained in connection with the station 1 questionnaire of FIG. 25.

Finally, the station 2 questionnaire of FIG. 26 calls for entry of a 0 (zero) for right hand flutes, a 1 (one) for left hand flutes, or a 2 (two) for straight flutes. Many of these questions are the same as corresponding questions on the station 1 questionnaire of FIG. 25, so that further elaboration is not needed.

FIG. 27 illustrates the page or questionnaire which is brought up on the TV tube 270 for station 3, which is used for the grinding step known as gashing, whereby the web of the fluted drill is made thinner at the point of the drill. Station or operation 3 uses the second grinding unit 192. The spindle head 52 is swivelled so that the tool 58 is parallel to the y-axis. The x- and y-axis drives are employed to position the tool 58, while the v-axis drive is employed to feed the pertinent grinding wheel 200 downwardly into engagement with the tool and to the desired depth. The r-axis drive is employed to produce the correct rotational offset of the tool, so that it is presented at the proper angle to the grinding wheel. Station 3 has the capability of providing separate depth settings for odd and even flutes. Thus, alternate flutes can be gashed to different depths.

It will be seen that the station 3 questionnaire of FIG. 27 begins by calling for the "V-DEPTH (−DEEP) #1" which refers to the depth to which the v-axis drive moves the grinding wheel for the first, third and other odd flutes. The reference to "(−DEEP)" indicates that the key labelled "−COMP" must be used to increase the depth of the cut.

The station 3 questionnaire of FIG. 27 then calls for the "X-TABLE POS. #1", which refers to the position of the x-axis drive for gashing odd numbered flutes. Next, the questionnaire calls for the "Y-CROSS SLIDE POS. (+DEEP) #1", which calls for the position of the y-axis drive for gashing odd numbered flutes. The reference to "(+DEEP)" indicates that the operator should use the key labelled "+COMP" for increasing the depth of the gashing cut in the y-direction.

In FIG. 27, the first three questions are then repeated for "#2" which refers to the second, fourth and other even numbered flutes. Thus, the V-depth and the x and y positions can be set separately for even and odd numbered flutes.

Next, the station 3 questionnaire of FIG. 27 calls for the "R-OFFSET" which is the initial rotational offset of the r-axis drive to correctly position the tool for the gashing operation. The questionnaire then calls for the "V-FEED RATE", which is the v-axis feed rate as the grinding wheel is moved downwardly for the gashing cut. Next, the questionnaire calls for the "V-START POS" which is the starting position of the v-axis drive, prior to moving the grinding wheel downwardly for the gashing cut. The v-axis drive also returns to this position after completing each cut, so that the tool 58 can be indexed to the next flute. Finally, the station 3 questionnaire calls for the number of flutes.

FIG. 28 illustrates the page or questionnaire which is brought up on the TV tube 270 for station or operation 4, which is used primarily for facing operations on the tool or drill blank 58. This station employs the drives for the x, y, v and r axes. The second grinding unit 192 is employed. The spindle head 52 is swivelled so that the tool 58 is parallel to the y-axis. The y-axis drive is employed to position the tool 58 initially, while the x and v-axis drives are employed to produce feeding movement between the tool and the grinding wheel.

The station 4 questionnaire of FIG. 28 begins by asking for the y-axis starting position, which is the position of the y-axis drive at the start of the cycle. This position centers the facing operation on the tool. The reference to (+DEEP) means that the operator must use the +COMP key to enter an incremental value which will increase the depth of the cut.

Next, the station 4 questionnaire of FIG. 28 calls for the X-START position, which is the starting position of the x-axis at the beginning of the cycle; the X-FEED STROKE (+ OR −) which is the total distance through which the x-axis drive will feed while performing the facing operation; and the X-FEED RATE. The x-axis feed stroke must be of sufficient length to cause the grinding wheel to end up off the surface of the tool. This value is positive if the x-axis feeds to the left, for right hand tools, and is minus if the x-axis feeds to the right for a left hand tool.

Then, the station 4 questionnaire of FIG. 28 calls for the X-V FEED ANGLE, which is the angle of the cut for the facing operation. This angle is always a positive angle in that the v-axis drive always rises when performing this operation. The angle is measured from the horizontal plane. An angle of 0 will result in no movement along the v-axis. Next, the questionnaire calls for the V-START position, which is the position at which the v-axis drive will start at the beginning of the cycle. The v-axis drive then feeds down to the desired depth, and then starts the facing operation. Thus, the questionnaire of FIG. 28 calls for the V-DEPTH with the notation (−DEEP), which indicates that the depth is increased incrementally by operating the −COMP key. The V-FEED RATE is then called for.

Finally, the station 4 questionnaire of FIG. 28 calls for the R-OFFSET which is the initial rotational offset imparted to the tool 58, and the number of flutes.

FIG. 29 illustrates the page or questionnaire which is brought up on the TV tube 270 by the central processing unit 274 for station or operation 5, which is employed primarily for pointing the tool 58. This station employs the third grinding unit 194, in which the b-axis drive is employed to produce vertical movement of the grinding wheel 202. Station 5 employs the x and y-axis drives to feed the tool 58 during the pointing operation. The b-axis drive is used to position the grinding wheel 262 in the desired position along the vertical axis. The r-axis drive is employed to impart the desired rotational position to the tool 58.

The station 5 questionnaire of FIG. 29 begins by calling for the X-START position and the Y-START position which are the starting positions of the x and y axis drives. During the pointing operation, the x and y axis drives are fed to create the angle of the point and the radius, if required. The questionnaire also calls for the B-POSITION which is the vertical position to which the b-axis drive is adjusted for the entire pointing operation. The b-axis drive does not move during the pointing operation.

The station 5 questionnaire of FIG. 29 also calls for the X-STROKE which is the length of the x-axis stroke to perform a pointing operation; and the X-FEED RATE during the pointing operation. The questionnaire calls for the R-OFFSET, which is the rotational offset of the tool 58, for both the first and second flutes; and the FACE ANGLE which is the angle of the tool face during the pointing operation.

Next, the station 5 questionnaire of FIG. 29 calls for the entry of a 0 (zero) if the radius operation is to be turned off, or a 1 (one) if the radius operation is to be turned on. The CPU 274 is capable of coordinating the x and y drives so that a radius is formed on the tool 58 at the junction between the point and the periphery of the drill. The questionnaire also calls for the dimension of the radius and the number of flutes.

FIG. 30 illustrates the page or questionnaire which is brought up on the TV tube 70 by the CPU 274 for station or operation 6, which is employed for radial relieving of the tool 58. For this station, the spindle head 52 is swivelled to the position shown in FIG. 1, in which the tool 58 is parallel to the x-axis. During radial relieving, the x-axis drive produces feeding movement of the tool 58 at the programmed feed rate while the r-axis drive turns the tool 58 in synchronism to the radial angle. The z-axis drive feeds down in a ramp fashion until the desired depth is reached. The z-axis drive then returns rapidly in the center of the flute. The z-axis ramping is phase shifted for the helix angle as the radial angle progresses toward the end. The a-axis drive is employed to position the grinding wheel at the desired angle. The y-axis drive is employed for initially positioning the tool along the y-axis.

The station 6 questionnaire of FIG. 30 begins by calling for the X-RETURN POINT and the X-FORWARD POINT, which are the return and forward points of the x-axis drive for each pass. The questionnaire then calls for the Z-DEPTH, which is the depth of the cut achieved by the z-axis drive at the low point; and the Z-START, which is the starting point for the z-axis drive before the downward ramping movement begins.

The station 6 questionnaire of FIG. 30 then calls for the Y-CROSS SLIDE POS. which is the position to which the y-axis drive is moved initially to remain there throughout the grinding operation; and the A-WHEEL ANGLE which is the angular position to which the a-axis drive adjusts the pertinent grinding wheel 128. This position is maintained throughout the grinding operation. The wheel angle is set to a value near the radial angle.

The station 6 questionnaire of FIG. 30 then calls for the R-OFFSET, which is the initial rotational offset imparted to the tool 58; the HELIX ANGLE which is the angle of the flute which was previously ground on the tool 58, before the radial relieving operation is started; and the radial angle which is the angle of the radial relieving pass or thread. The questionnaire also calls for the diameter of the tool, the number of flutes, and the X-FEED RATE which is the feed rate of the x-axis drive during the relieving operation.

Finally, the station 6 questionnaire of FIG. 30 calls for the R-HIGH DWELL PERIOD, which is a rotational dwell, available for selection by the operator, that allows the z-axis drive to remain stationary for a short period, after each flute and before motion of the z-axis drive starts again. The radial relieving operation can be used for a variety of purposes, such as the grinding of threads on a tap, on which flutes have previously been ground.

In setting up and programming the grinding machine 50, the operator enters all of the known values on all of the questionnaire pages, as represented by FIGS. 25–30.

The depth values may or may not be known. The operator enters the known depth values. The unkown depth values must be determined by touching off on the work, so that the grinding wheel is just touching the tool 58. The tochng off process is done for each step, by manually jogging the pertinent drive axes into the proper positions for beginning the grinding operation on the tool. Each axis drive can be jogged by using the appropriate jogging key on the keyboard 268. Alternatively, the pendant control unit 300 can be used by operating the eight position switch 310 to the position for the desired drive axis. The handwheel 304 can then be turned to produce corresponding movement of the servomotor for the selected drive axis. In this way, the tool 58 and the pertinent grinding wheel can be positioned so that the grinding wheel is just barely touching the tool. The position of the drive axis is then entered in the programming memory by bringing up the appropriate questionnaire page on the TV tube 270, adjusting the cursor 342 to the line which calls for the position of the appropriate drive axis, and operating the key which is labelled "SET POINT". This operation takes the value from the encoder of the drive axis and enters it into the program memory, as provided by the RAM 280. This programming process is repeated for each drive axis involved in each step in the grinding process.

This touching off process has the effect of setting each depth value to 0 (zero). Each depth value can be increased by using the numerical keys on the keyboard 268 to enter an incremental value, which is then added to or subtracted from the value in the memory by using the keys labelled "+COMP" and "−COMP". Care should be taken to avoid setting the depth values too deep initially. In fact, it is best to set all depth values at the touch-off points initially, and to run the machine through a grinding cycle before increasing the depth values. This procedure minimizes the possibility of damaging the machine by the setting of excessive depth values.

The pendant control unit 300 is connected to the end of a long cable to allow the operator to move freely around the machine with the pendant in hand, while the machine is being set up and programmed. The operator is free to look at any aspect of the setup, while any axis drive is being moved by turning the hand wheel 304. In this way, touching off can be achieved between the pertinent grinding wheel and the tool. The numerical value of the touching off position can then be transferred from the encoder for the drive axis to the program memory, simply by pushing the SET POINT key on the keyboard 268, without any possible key punching error.

FIGS. 31–36 are representative program cycle charts for Stations 1–6, respectively, previously referred to in connection with FIGS. 24–30. These cycle charts illustrate the operation of the tool grinding machine 50 for the various stations. Those skilled in the art of computerized control systems will readily be able to program the CPU 274, including the PROM 278 and the RAM 280, on the basis of these cycle charts of FIGS. 31–36, or the questionnaire pages of FIGS. 24–30, or both.

Figure 31:
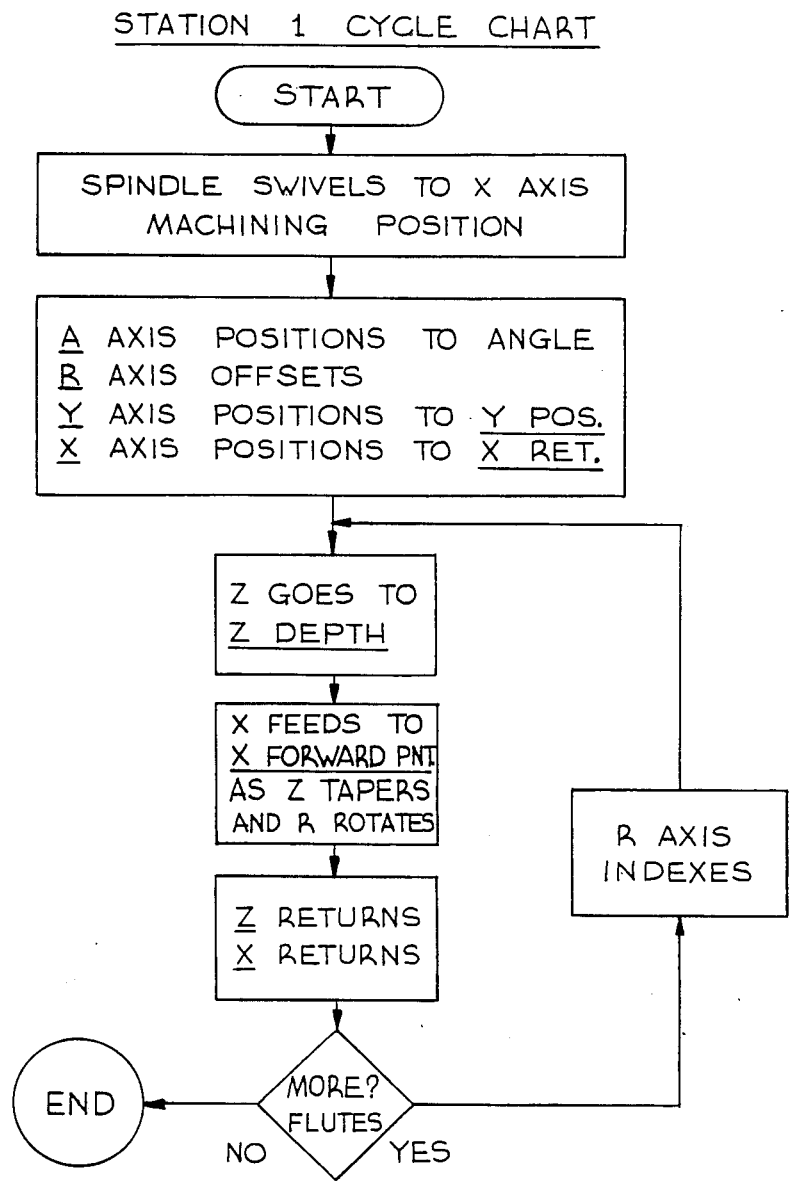

FIG. 31 shows the program or cycle for Station 1 which is used for fluting and relieving flutes. This cycle starts with the swiveling of the spindle 54 to the X-axis machining position, as shown in full lines in FIG. 1. The A-axis drive then positions or swivels the grinding wheel 128 to the selected angle, entered by the operator in answering the questionnaire of FIG. 1. The R-axis drive then rotates the spindle 54 and the tool 58 to the selected offset angle, as needed and as previously entered by the operator. Such offset angle may be zero.

Next, the Y-axis drive positions the Y-axis or cross slide carriage 96 to the previously selected Y position, as referred to in connection with FIG. 25. The X-axis drive positions the X-axis carriage 86 and the tool 58 to the previously selected X return point (FIG. 25).

Then, the Z-axis drive, operable by the servomotor 178, causes the pertinent grinding wheel 128 to move down to the previously selected Z depth position. The X axis drive feeds the tool 58 to the preselected X forward point (FIG. 25), as the Z axis drive gradually raises the pertinent grinding wheel 128 to taper the depth of the flute or other cut. While this is going on, the R axis drive also gradually rotates the tool 58 to produce the helical flute with the preselected helix angle (FIG. 25).

Next, as shown in FIG. 31, the Z axis drive returns the grinding wheel 128 upwardly to the point of beginning, while the X-axis drive returns the tool 58 to the preselected X return point (FIG. 25).

The CPU 274 determines from the RAM 280 whether more flutes are to be ground, as selected previously by the operator (FIG. 25). If so, the R-axis drive indexes the tool 58 by a corresponding angle, such as 180° for two flutes, from the initial R offset position. A portion of the control sequence is then repeated, beginning with the point at which the Z-axis drive moves the grinding wheel 128 to the preselected Z depth. If no further flute is called for by the program, the cycle for Station 1 is brought to an end.

Figure 32:
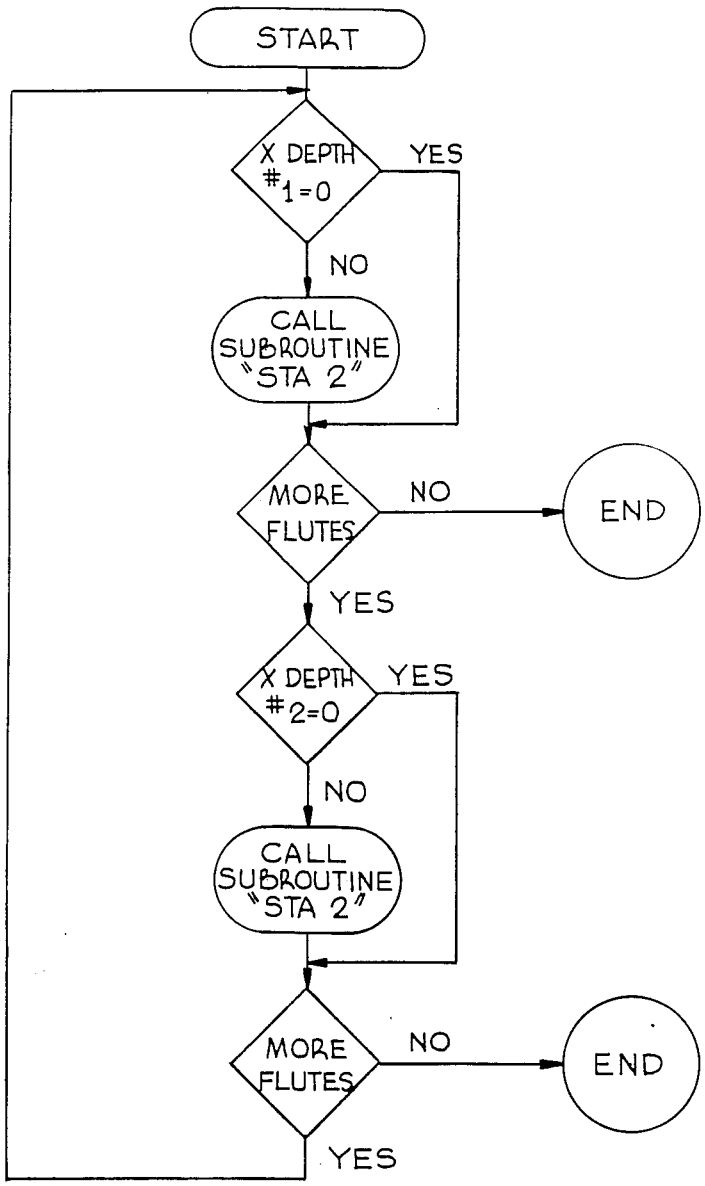
Figure 32A:
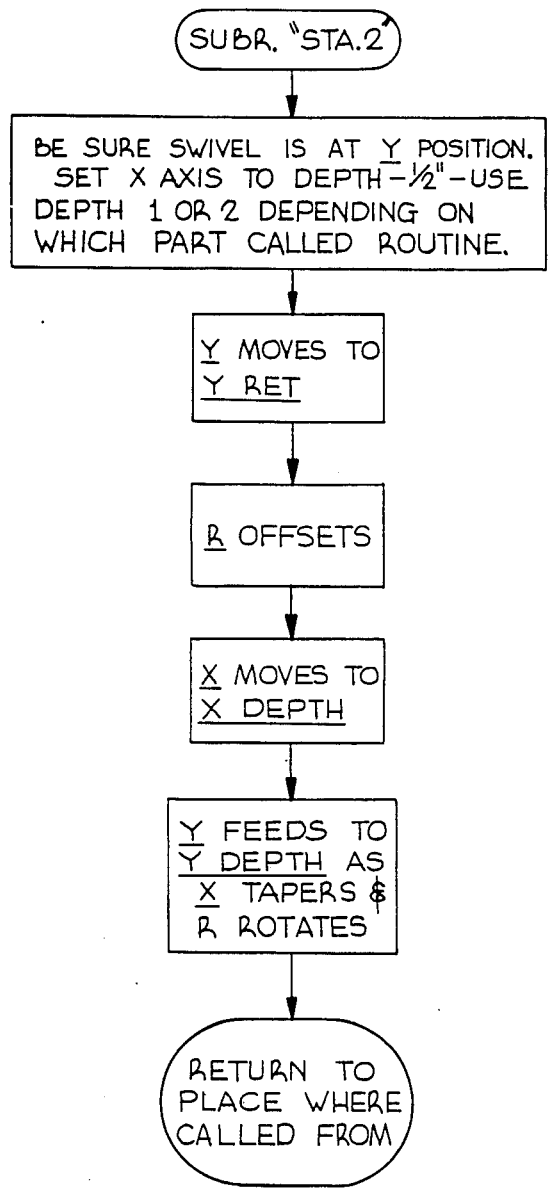

FIGS. 32 and 32a show a chart for Station 2 used for relieving. Such program is an alternative to the program previously described in connection with FIG. 26. The program of FIG. 32 provides for the selection of different X depth values for odd numbered (#1) flutes and even numbered (#2) flutes. If all flutes are to have the same depth, the X depth #1 is selected at the desired depth, while the X depth #2 is left at zero.

The program of FIG. 32 begins by determining from the memory whether or not the X depth #1 is zero. If not, the program goes on to subroutine "Sta 2", as shown in FIG. 32a. If X depth #1 is zero, such subroutine is skipped.

As shown in FIG. 32a, the subroutine "Sta 2" begins by causing the spindle head 52 to swivel to the Y-axis position, as shown in broken lines in FIG. 1, if the swivel head is not already in such position. The X-axis drive is then employed to set or move the tool 58 to the X depth minus one-half inch, using depth #1 or #2, depending on whether the subroutine was called for by the #1 part or the #2 part of the program of FIG. 32.

Next, the Y-axis drive moves the Y carriage 96 and the tool 58 to the Y return point, as previously selected and entered in the memory 280 by the operator. The R-axis drive rotates the tool 58 to the preselected R offset angle which may be zero. The X-axis drive moves the tool 58 to the preselected X depth. Then, the Y-axis drive feeds the tool 58 to the preselected Y depth as the X-axis drive tapers the X depth and the R-axis drive gradually rotates the tool 58 to produce a helical cut. The control then returns to the main program of FIG. 32 to complete such program.

The main program then inquires whether or not more flutes are to be ground. If not, the cycle comes to an end. If one or more additional flutes are required, the program inquires whether or not the X depth #2 is zero. If not, the subroutine "Sta 2" is repeated, using the X depth #2. If the X depth #2 is zero, the subroutine is skipped.

When the subroutine "Sta 2" is completed, or if it is skipped, the main program again inquires whether more flutes are to be ground. If not, the cycle comes to an end. If one or more additional flutes are required, the cycle returns to the beginning and repeats.

Figure 33:
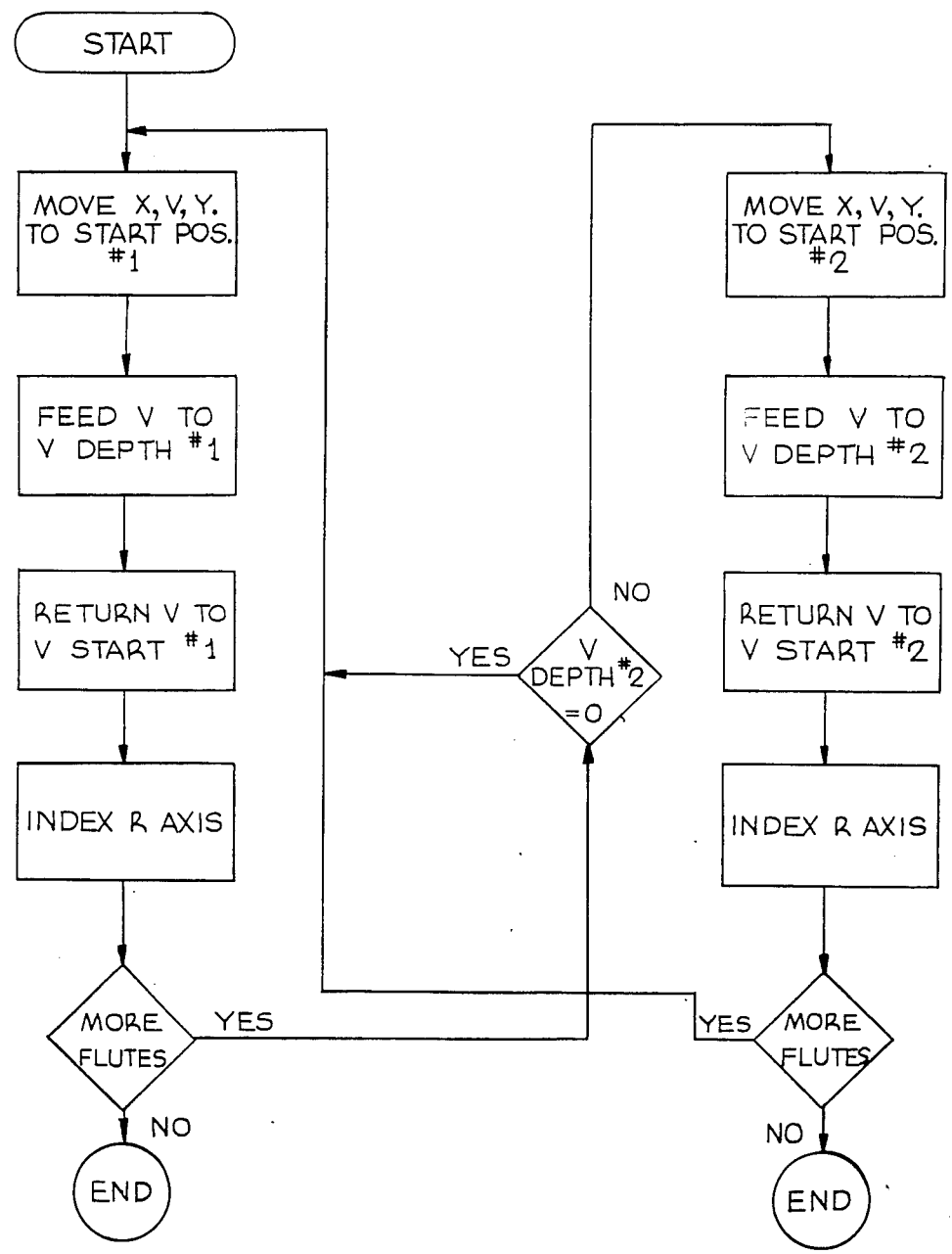

FIG. 33 shows the program or cycle chart for Station 3, which is used primarily for gashing, to thin the web at the point of the drill. For this station, the spindle head 62 is swiveled to the Y-axis position, if it is not already in such position. The X, V and Y axis drives are moved to the previously selected start position, as discussed in connection with FIG. 27. The V axis drive is then operated to move the pertinent grinding wheel 200 to the preselected V depth #1 for odd numbered flutes. This feeds the grinding wheel into the tool to gash the tool.

The V axis drive is then returned to the V start position, and the R axis drive is employed to rotate or index the tool to the position for the next flute, if any. The CPU 274 then inquires of the memory 280 whether or not more flutes are to be ground. If not, the cycle comes to an end. If one or more additional flutes are to be ground, the CPU 274 inquires whether or not the V depth #2 is zero. If so, this means that all flutes are to be ground to the same V depth #1, whereupon the cycle returns to the starting point so that the next flute is ground to the #1 depth. If the V-depth #2 is not zero, the cycle goes to a new part of the routine, in which the X, V and Y drives are positioned in the #2 start positions. The V axes drive is then operated to feed the pertinent grinding wheel 200 to the V depth #2, to gash the tool to the #2 depth.

The V axis drive is then returned to the V start position #2, and the R axis drive is indexed to the position of the next flute, if any. Inquiry is made as to whether or not more flutes are required. If not, the cycle comes to an end. If one or more additional flutes are required, the cycle returns to the starting point and repeats.

Figure 34:
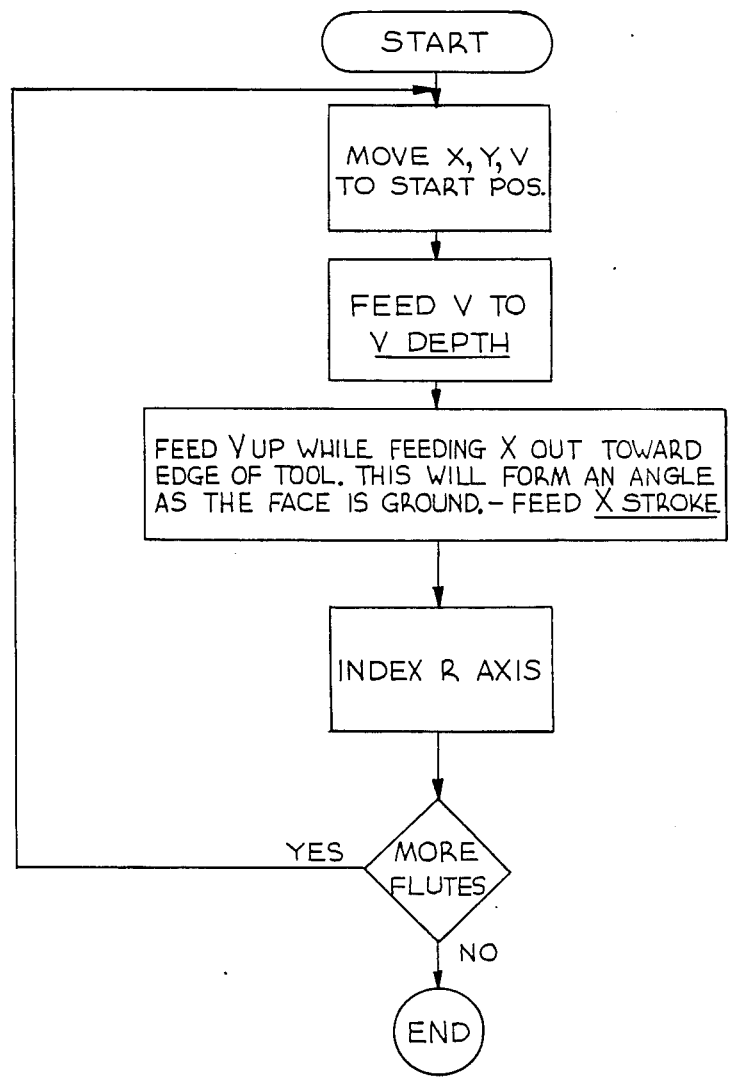

FIG. 34 shows the program or cycle diagram for Station 4, which is used principally for facing, as described previously in connection with FIG. 28. For this station, the spindle head 62 is swiveled to the Y axis position, so that the tool 58 can be presented to the V axis grinding unit 192. The cycle starts by moving the X, Y and V axis drives to the X, Y and V start positions, as discussed in connection with FIG. 28. The V axis drive is then fed to the V depth, as previously selected.

The Station 4 grinding operation is then carried out by feeding the V drive up to raise the grinding wheel as the X drive is fed out toward the edge of the tool 58. This forms an angle as the face of the tool is ground. The X drive is fed through the previously selected X stroke (FIG. 28). This completes the first facing operation.

The R axis drive is then employed to rotate or index, the tool to the position of the next flute, if any. The CPU 274 then ascertains from the memory 280 whether or not more flutes are to be ground. If so, the cycle is repeated from the starting point. If not, the cycle is brought to an end.

Figure 35:
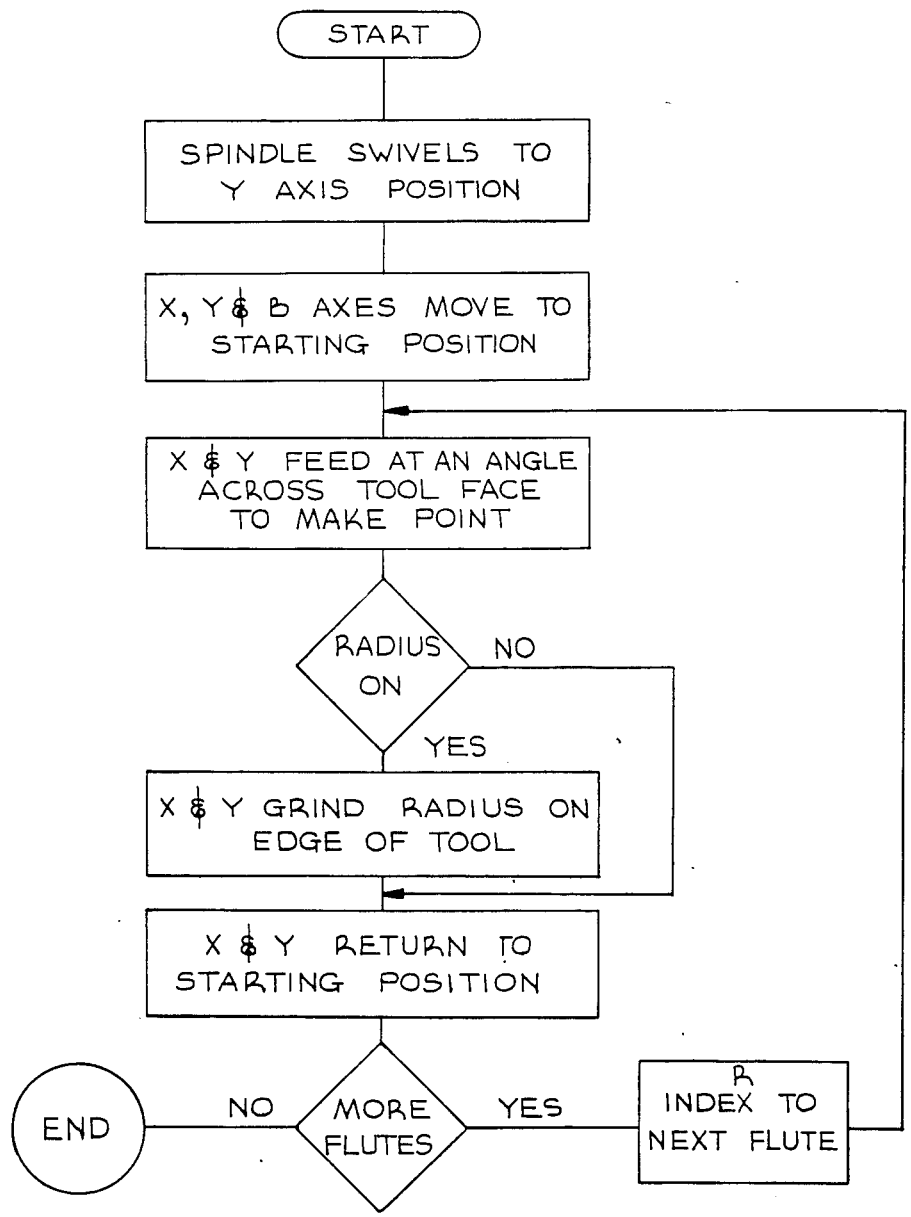

FIG. 35 shows the program or cycle chart for Station 5, which is used for pointing the drill, as explained in connection with FIG. 29. For this station, the spindle 54 is swiveled to the Y axis position to present the tool 58 to the B axis grinding unit 194. The X, Y and B axis drives are moved to their preselected starting positions, as described in connection wIth FIG. 29. Then, the X and Y axis drives are used simultaneously and in coordination to produce feeding movement at the preselected face angle across the tool face between the tool and the grinding wheel 262, to make the point. The CPU 274 ascertains from the memory whether or not the radius control is to be on. If so, the radius control coordinates the X and Y axis feeding movements to form the preselected radius at the outer edge or corner of the point. If the radius control is not to be on, the radius function is skipped so that the point is formed with a sharp corner, rather than a radius.

The X and Y axis drives are then returned to their starting positions. The CPU 274 ascertains from the memory 280 whether or not more flutes are to be ground. If so, the R axis drive rotates or indexes the tool 58 to present the next flute. A portion of the cycle is then repeated, beginning with the X and Y feeding movement. If no additional flute is to be ground, the cycle is brought to an end.

Figure 36:
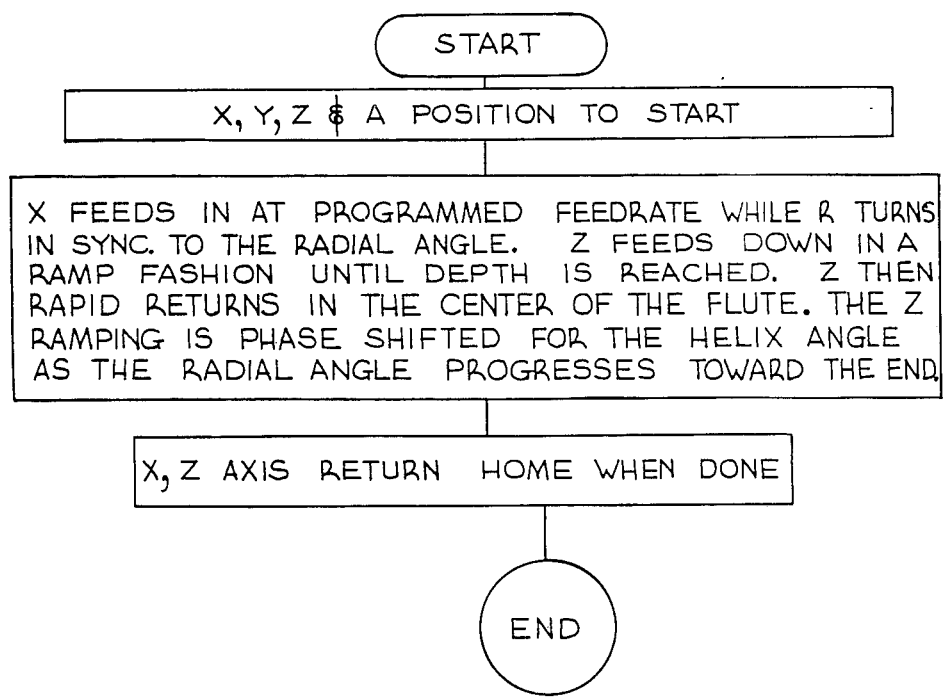

FIG. 36 shows this program or cycle chart for Station 6, which is used primarily for radial relieving, as described in connection with FIG. 30. The spindle 54 is swiveled to the X-axis position for this station. Initially, the X, Y, Z and A axis drives are moved to their starting or return points.

The X drive then feeds in at the previously programmed rate, as described in connection with FIG. 30, while the R drive turns the tool 58 in synchronism to the radial angle. The Z drive then feeds down in a ramp fashion until the preselected Z depth is reached, whereupon the Z drive rapidly returns in the center of the flute. The Z drive ramping is phase shifted for the helix angle as the radial angle progresses toward the end. Then, the X and Z axis drives return to their home or starting points, which brings the cycle to an end.

The unloader 230 has the important advantage that the finished drills or other tools are individually received in the pockets or openings 234 in the rotary turret or receiver 232. In this way, the drills are kept apart so that they will not scratch or otherwise damage one another. As all of the openings 234 become full, the finished drills are removed manually from time to time and packaged.

We claim:

1. An unloading mechanism for a tool grinding machine for grinding drills or other tools, said mechanism comprising
   a chuck for holding a tool,
   a turret having a plurality of angularly spaced openings for receiving successive finished tools from said chuck,
   a carriage for supporting said turret,
   means for rotatably mounting said turret on said carriage,
   detent means for detaining said turret with the successive openings in an unloading position to receive the successive finished tools,
   power means for causing relative reciprocating movement between said carriage and said chuck to bring said unloading position into and out of alignment with said chuck,
   means for ejecting a tool from said chuck into the opening at said unloading position,
   and indexing means operative upon relative movement of said carriage and said chuck out of alignment for indexing said turret through one angular step to bring the next opening into the unloading position,
   said mechanism including means for supporting said carriage for reciprocating movement relative to said chuck,
   said power means including means for reciprocating said carriage to move said unloading position into and out of alignment with said chuck,
   said indexing means including a ratchet wheel on said turret,
   a pawl positioned for engagement by said ratchet wheel upon movement of said carriage out of said unloading position for advancing said ratchet wheel to index said turret through one angular step,
   a stationary pivot supporting said pawl for swinging movement,
   a spring biasing said pawl into the path of said ratchet wheel,
   and a stop limiting the swinging movement of said pawl under the biasing action of said spring.

2. An unloading mechanism for a tool grinding machine for grinding drills or other tools, said mechanism comprising
   a chuck for holding a tool,
   a turret having a plurality of angularly spaced openings for receiving sucessive finished tools from said chuck,
   a carriage for supporting said turret,
   means for rotatably mounting said turret on said carriage,
   detent means for detaining said turret with the successive openings in an unloading position to receive the successive finished tools,
   means for supporting said carriage for reciprocating movement relative to said chuck,
   power means for causing reciprocating movement of said carriage in opposite directions to move said unloading position into and out of alignment with said chuck,
   means for ejecting a tool from said chuck into the opening at said unloading position,
   and indexing means operative upon said reciprocating movement of said carriage in one direction for indexing said turret through one angular step to bring the next opening into the unloading position,
   said indexing means including a ratchet wheel on said turret,
   a pawl positioned for engagement by said ratchet wheel upon said reciprocating movement of said carriage in one direction for advancing said ratchet wheel to index said turret through one angular step,
   a stationary pivot supporting said pawl for swinging movement,
   biasing means for biasing said pawl into the path of said ratchet wheel,
   and stop means for limiting the swinging movement of said pawl under the biasing action of said biasing means.

* * * * *